United States Patent
Pehlke et al.

(10) Patent No.: US 10,587,291 B2
(45) Date of Patent: *Mar. 10, 2020

(54) FRONT-END ARCHITECTURE HAVING SPLIT TRIPLEXER FOR CARRIER AGGREGATION AND MIMO SUPPORT

(71) Applicant: SKYWORKS SOLUTIONS, INC., Woburn, MA (US)

(72) Inventors: David Richard Pehlke, Westlake Village, CA (US); John Chi-Shuen Leung, Foothill Ranch, CA (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/956,711

(22) Filed: Apr. 18, 2018

(65) Prior Publication Data

US 2019/0123769 A1   Apr. 25, 2019

Related U.S. Application Data

(60) Provisional application No. 62/486,565, filed on Apr. 18, 2017, provisional application No. 62/486,573, filed on Apr. 18, 2017, provisional application No. 62/486,578, filed on Apr. 18, 2017.

(51) Int. Cl.

| | |
|---|---|
| H04B 1/00 | (2006.01) |
| H04B 1/40 | (2015.01) |
| H04J 1/04 | (2006.01) |
| H04B 7/08 | (2006.01) |
| H04W 88/02 | (2009.01) |

(52) U.S. Cl.
CPC ............ H04B 1/0057 (2013.01); H04B 1/40 (2013.01); H04B 7/08 (2013.01); H04B 7/0825 (2013.01); H04J 1/045 (2013.01); H04W 88/02 (2013.01)

(58) Field of Classification Search
None
See application file for complete search history.

(56) References Cited

U.S. PATENT DOCUMENTS

| | | | |
|---|---|---|---|
| 8,457,685 B1 * | 6/2013 | Bauder | H04B 1/18 455/553.1 |
| 10,075,199 B2 * | 9/2018 | King | H04B 1/0057 |
| 2010/0113097 A1 * | 5/2010 | Seeor | H04W 88/085 455/562.1 |
| 2014/0024322 A1 * | 1/2014 | Khlat | H04B 7/0404 455/78 |
| 2015/0304059 A1 * | 10/2015 | Zuo | H04B 1/0064 370/343 |

(Continued)

Primary Examiner — Lana N Le
(74) Attorney, Agent, or Firm — Chang & Hale LLP

(57) ABSTRACT

Front-end architecture having split triplexers for carrier aggregation and MIMO support. In some embodiments, a multiplexing architecture can include an assembly of filters configured to support carrier aggregation with one or more antennas. The assembly of filters can include a first triplexer configured to support a low-band, a mid-band, and a first high-band. The assembly of filters can further include a second triplexer configured to support the low-band, the mid-band, and a second high-band. The multiplexing architecture can further include a switch assembly implemented between the assembly of filters and respective one or more nodes associated with the one or more antennas.

20 Claims, 10 Drawing Sheets

(56) References Cited

U.S. PATENT DOCUMENTS

| | | | | |
|---|---|---|---|---|
| 2016/0112072 A1* | 4/2016 | Bauder | ................ | H04B 1/0057 370/297 |
| 2016/0119003 A1* | 4/2016 | Granger-Jones | ....... | H04B 1/006 370/276 |
| 2016/0149690 A1* | 5/2016 | Khlat | ................ | H04W 72/0446 370/280 |
| 2016/0191107 A1* | 6/2016 | Khlat | ................... | H04B 7/0602 370/328 |
| 2016/0380608 A1* | 12/2016 | Ni | ........................ | H04B 1/0057 333/133 |
| 2017/0094608 A1* | 3/2017 | Langer | ................. | H04W 52/08 |
| 2017/0163484 A1* | 6/2017 | Hou | .................... | H04B 1/0057 |
| 2017/0251474 A1* | 8/2017 | Khlat | ................... | H04B 1/0092 |
| 2017/0288707 A1* | 10/2017 | Yun | ......................... | H03H 3/00 |
| 2017/0288765 A1* | 10/2017 | Khlat | .................... | H04B 7/0802 |
| 2017/0359113 A1* | 12/2017 | Lee | ....................... | H04B 17/15 |
| 2017/0373368 A1* | 12/2017 | Srirattana | ................. | H01P 5/18 |
| 2018/0152945 A1* | 5/2018 | Balteanu | ................... | H04L 5/14 |

* cited by examiner

FRONT-END ARCHITECTURE HAVING SPLIT TRIPLEXER FOR CARRIER AGGREGATION AND MIMO SUPPORT

CROSS-REFERENCE TO RELATED APPLICATION(S)

This application claims priority to U.S. Provisional Application Nos. 62/486,565 filed Apr. 18, 2017, entitled SPLIT TRIPLEXER ARCHITECTURE FOR CARRIER AGGREGATION AND MIMO SUPPORT IN ADVANCED RADIO-FREQUENCY FRONT-ENDS, 62/486,573 filed Apr. 18, 2017, entitled SPLIT DIPLEXER ARCHITECTURE FOR CARRIER AGGREGATION AND MIMO SUPPORT IN ADVANCED RADIO-FREQUENCY FRONT-ENDS, and 62/486,578 filed Apr. 18, 2017, entitled QUADPLEXER ARCHITECTURE FOR CARRIER AGGREGATION AND MIMO SUPPORT IN ADVANCED RADIO-FREQUENCY FRONT-ENDS, the disclosure of each of which is hereby expressly incorporated by reference herein in its entirety.

BACKGROUND

Field

The present disclosure relates to front-end systems, devices, circuits and/or methods for wireless applications.

Description of the Related Art

In wireless applications, a front-end provides an interface between a radio-frequency circuit and one or more antennas. Such a radio-frequency circuit can provide either or both of transmit and receive functionalities.

SUMMARY

According to some teachings, the present disclosure relates to a multiplexing architecture that includes an assembly of filters configured to support carrier aggregation with one or more antennas. The assembly of filters includes a first triplexer configured to support a low-band, a mid-band, and a first high-band. The assembly of filters further includes a second triplexer configured to support the low-band, the mid-band, and a second high-band. The multiplexing architecture further includes a switch assembly implemented between the assembly of filters and respective one or more nodes associated with the one or more antennas.

In some implementations, the present disclosure relates to a packaged module for wireless applications. The packaged module includes a packaging substrate configured to receive a plurality of components, and a multiplexing circuit implemented on the packaging substrate. The multiplexing circuit includes an assembly of filters configured to support carrier aggregation with one or more antennas. The assembly of filters includes a first triplexer configured to support a low-band, a mid-band, and a first high-band. The assembly of filters further includes a second triplexer configured to support the low-band, the mid-band, and a second high-band. The multiplexing circuit further includes a switch assembly implemented between the assembly of filters and respective one or more nodes associated with the one or more antennas.

In a number of implementations, the present disclosure relates to a wireless device that includes a transceiver and a plurality of antennas each configured to support either or both of transmit and receive operations. The wireless device further includes a multiplexing architecture implemented between the transceiver and the plurality of antennas, and includes an assembly of filters configured to support carrier aggregation with one or more of the plurality of antennas. The assembly of filters includes a first triplexer configured to support a low-band, a mid-band, and a first high-band. The assembly of filters further includes a second triplexer configured to support the low-band, the mid-band, and a second high-band. The multiplexing architecture further includes a switch assembly implemented between the assembly of filters and respective one or more nodes associated with the one or more antennas.

In accordance with some implementations, the present disclosure relates to a multiplexing architecture that includes an assembly of filters configured to support carrier aggregation with one or more antennas. The assembly of filters includes a first diplexer configured to support a mid-band and a first high-band. The assembly of filters further includes a second diplexer configured to support the mid-band and a second high-band. The multiplexing architecture further includes a switch assembly implemented between the assembly of filters and respective one or more nodes associated with the one or more antennas.

In a number of teachings, the present disclosure relates to a packaged module for wireless applications. The packaged module includes a packaging substrate configured to receive a plurality of components, and a multiplexing circuit implemented on the packaging substrate. The multiplexing circuit includes an assembly of filters configured to support carrier aggregation with one or more antennas. The assembly of filters includes a first diplexer configured to support a mid-band and a first high-band. The assembly of filters further includes a second diplexer configured to support the mid-band and a second high-band. The multiplexing circuit further includes a switch assembly implemented between the assembly of filters and respective one or more nodes associated with the one or more antennas.

In some implementations, the present disclosure relates to a wireless device that includes a transceiver and a plurality of antennas each configured to support either or both of transmit and receive operations. The wireless device further includes a multiplexing architecture implemented between the transceiver and the plurality of antennas, and having an assembly of filters configured to support carrier aggregation with one or more of the plurality of antennas. The assembly of filters includes a first diplexer configured to support a mid-band and a first high-band. The assembly of filters further includes a second diplexer configured to support the mid-band and a second high-band. The multiplexing architecture further includes a switch assembly implemented between the assembly of filters and respective one or more nodes associated with the one or more antennas.

In some teachings, the present disclosure relates to a multiplexing architecture having a quadplexer configured to support carrier aggregation with a common antenna. The quadplexer includes a low-band filter, a mid-band filter, a first high-band filter, and a second high-band filter, with each filter having a respective input node, and the quadplexer including a common output node.

In a number of implementations, the present disclosure relates to a front-end architecture that includes a quadplexer configured to support uplink carrier aggregation with a first antenna. The quadplexer includes a low-band filter, a mid-band filter, a first high-band filter, and a second high-band filter, with each filter having a respective input node, and the quadplexer including a common output node associated with the first antenna. The front-end architecture further includes a triplexer configured to support uplink carrier aggregation with a second antenna. The triplexer includes a mid-band filter, a first high-band filter, and a second high-band filter, with each filter having a respective input node, and the triplexer including a common output node associated with the second antenna.

In some implementations, the present disclosure relates to a wireless device having a transceiver and a plurality of antennas each configured to support either or both of transmit and receive operations. The wireless device further includes a front-end architecture implemented between the transceiver and the antennas. The front-end architecture includes a quadplexer configured to support uplink carrier aggregation with a first antenna. The quadplexer includes a low-band filter, a mid-band filter, a first high-band filter, and a second high-band filter, with each filter having a respective input node, and the quadplexer including a common output node associated with the first antenna. The front-end architecture further includes a triplexer configured to support uplink carrier aggregation with a second antenna. The triplexer includes a mid-band filter, a first high-band filter, and a second high-band filter, with each filter having a respective input node, and the triplexer including a common output node associated with the second antenna.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
FIG. 1 depicts a multiplexing architecture having one or more features as described herein.

FIG. 1 depicts a multiplexing architecture 100 having one or more features as described herein. For the purpose of description, it will be understood that multiplexing, multiplex, multiplexer, etc. can include diplexing, diplex, diplexer, etc., triplexing, triplex, triplexer, etc., quadplexing, quadplex, quadplexer, etc., respectively, or any combination thereof.

Figure 2:
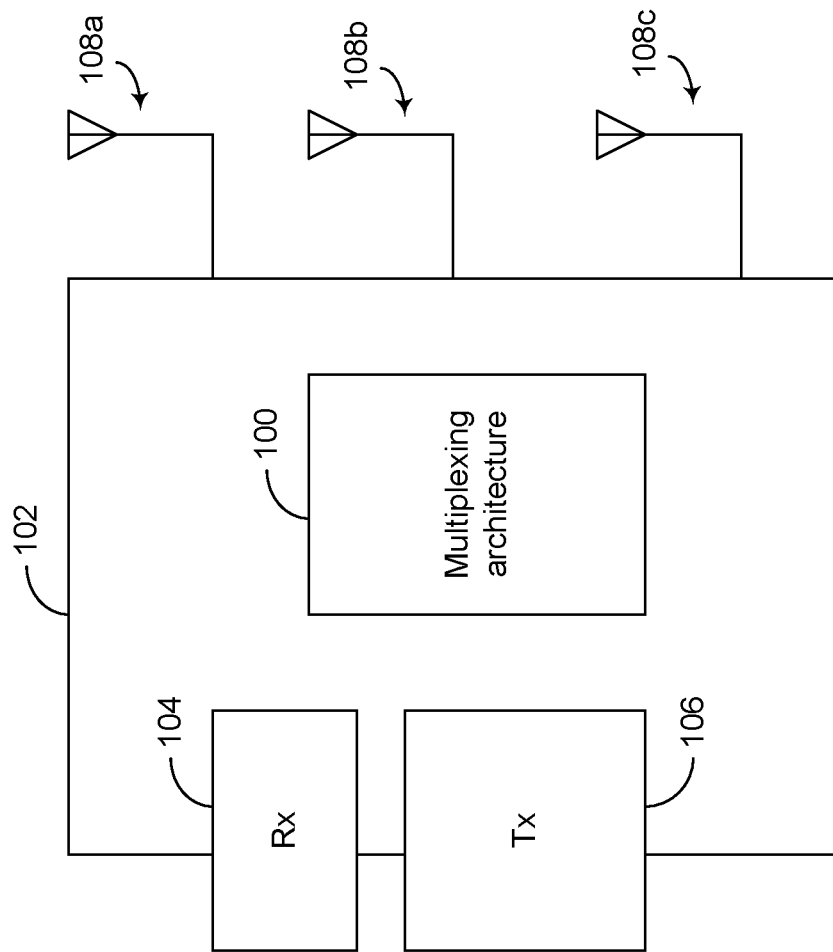
FIG. 2 shows that in some embodiments, the multiplexing architecture of FIG. 1 can be implemented at least partially in a front-end of a wireless device having multiple antennas.

FIG. 2 shows that in some embodiments, the multiplexing architecture 100 of FIG. 1 can be implemented in a front-end 102 of a wireless device or system. More particularly, in FIG. 2, a front-end 102 of a wireless device is depicted as supporting multiple antennas 108a, 108b, 108c for receive (Rx) operations and/or transmit (Tx) operations. Such receive operations can be achieved with a receiver circuit 104, and such transmit operations can be achieved with a transmitter circuit 106. For the purpose of description, it will be understood that the receiver circuit 104 may be considered to be at least partially within the front-end 102, external to the front-end 102, or any combination thereof. Similarly, the transmitter circuit 106 may be considered to be at least partially within the front-end 102, external to the front-end 102, or any combination thereof.

In the example of FIG. 2, the wireless device is depicted as including three antennas. It will be understood that one or more feature of the present disclosure can be implemented with more or less number of antennas. Thus, for the purpose of description, it will be understood that multiple antennas can include two or more antennas.

It is noted that conventional advanced front-ends with strong requirements for carrier aggregation (CA) often rely on some or all of the following techniques to combine frequency bands onto the same radio-frequency (RF) signal trace for a shared antenna feed: (1) ganged filters that are permanently connected together with a common shared connection point; (2) switch-combined filters that are electrically connected together through simultaneous active throws of a switch to a shared connection point; (3) diplexers/triplexers that combine frequency ranges to a common connection point, and (4) multiple antennas that enable separate bands to be radiatively transmitted/received with separate antennas and combined in the far field.

With respect to the first technique (1) mentioned above, it is noted that the ganged N-plexing of filters such as acoustic filters typically suffers from the inflexibility of the restrictive and permanent combinations of specific bands that cannot be readily updated to accommodate new combinations if required or desired. It is further noted that such a configuration cannot support multiple overlapping band combinations without filter duplication, and the single band operation is impacted because the ganged configuration of many filters typically increases insertion loss through the loading incurred from the many filters sharing the same loading connection point.

With respect to the second technique (2) mentioned above, it is noted that switch-combined filters typically require dedicated filter design attention, and is also typically restrictive in support of specific band combinations. Such a technique, however, typically enables single band operation to avoid loading loss and achieve higher performance than if all the filters are permanently ganged.

With respect to the fourth technique (4) mentioned above, it is noted that radiation from multiple antennas is typically not practical if it is required that all antennas support active simultaneous bands in features such as 4×4 downlink (DL) multiple-input and multiple-output (MIMO), where all 4 antennas in a 4-antenna wireless device (e.g., cellular phone) would need to simultaneously support mid-band and high-band combinations.

The diplex/triplex approach (3) mentioned above can be often flexible in that it can enable a mid-band to be combined with a high-band. However, such an approach can incur a significant overall loss if the architecture is designed with many series cascades of multiple switches and diplexers. Also a single triplexer approach can incur a significant insertion loss, because of the constraint of many bands that are close in frequency. Further, such a single triplexer approach can encounter difficulty in filtering with respect to a common connection point.

Figure 3:
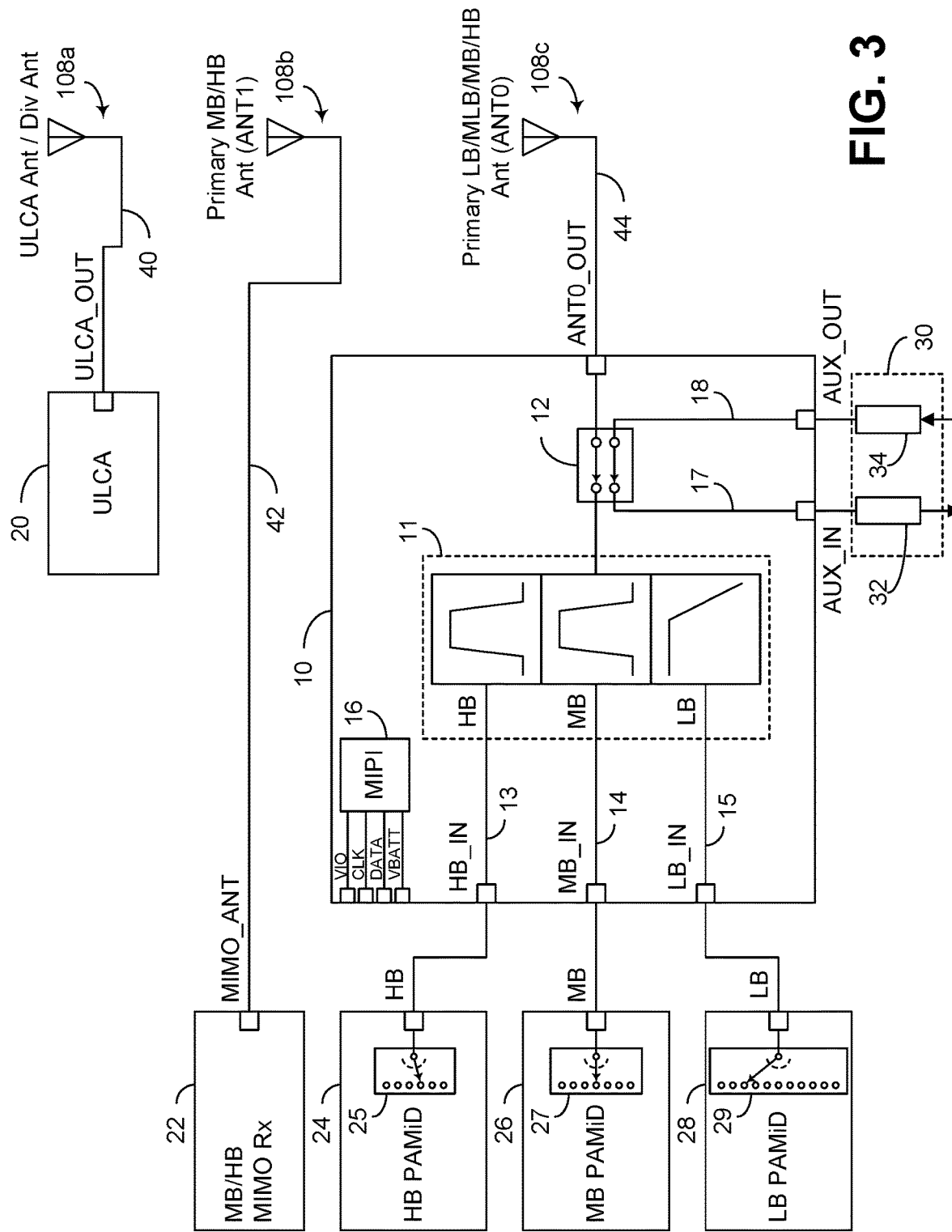
FIG. 3 shows an example front-end architecture having a single triplexer configured to support a low-band (LB), a mid-band (MB), and a high-band (HB), where the high-band has a large frequency range with a lower end separated from an upper end of the mid-band a relatively small frequency gap.

FIG. 3 shows an example of the foregoing diplex/triplex approach, in which a front-end architecture 10 relies on a single triplexer 11 configured to support high-band (HB), mid-band (MB), and low-band (LB). In the example of FIG. 3, the triplexer 11 needs to support the entire example frequency range of 2300 MHz-2690 MHz of the high-band, and such a high-band is only separated from the upper end of the example mid-band frequency range (1710 MHz-2200 MHz) by a 100 MHz gap. Accordingly, the example architecture of FIG. 3 can have significant insertion loss at the band edges where adjacent band edges are closest or sufficiently near to each other.

In the example of FIG. 3, multiple antennas are provided to support carrier aggregation (CA) and/or MIMO operations. For example, uplink (UL) carrier aggregation (CA) (ULCA) can be achieved with an ULCA block 20 and an antenna 108a, through an antenna path 40 (from an output ULCA_OUT of the ULCA block 20 to the antenna 108a). In some embodiments, the antenna 108a can also be utilized as a diversity antenna. Thus, in the example of FIG. 3, the antenna 108a is indicated as ULCA Ant/Div Ant.

Referring to FIG. 3, in another example, MIMO receive operations can be achieved in mid-band and high-band with a MIMO block 22 and an antenna 108b, through an antenna path 42 (between the antenna 108b and a node MIMO_ANT of the MIMO block 22). In some embodiments, the antenna 108b can be one of a plurality of primary antennas. Thus, in the example of FIG. 3, the antenna 108b is indicated as Primary MB/HB Ant (ANT1).

Referring to FIG. 3, in another example, the triplexing front-end architecture 10 can be utilized to support various transmit and/or receive operations, including carrier aggregation and non-carrier aggregation operations and/or MIMO operations, for low, mid and high-bands. The low-band operations can be achieved with, for example, a low-band (LB) power amplifier module integrated duplexer (PAMiD) block 28 configured to support a plurality of low-band frequency bands for transmission through a signal node LB. In some embodiments, the LB block 28 can support receive operations with its duplexer functionality. In some embodiments, the LB block 28 can include a switch 29 having a pole coupled to the signal node LB and N throws (e.g., N=11), to support the plurality of low-band frequency bands.

Referring to FIG. 3, the mid-band operations can be achieved with, for example, a mid-band (MB) power amplifier module integrated duplexer (PAMiD) block 26 configured to support a plurality of mid-band frequency bands for transmission through a signal node MB. In some embodiments, the MB block 26 can support receive operations with its duplexer functionality. In some embodiments, the MB block 26 can include a switch 27 having a pole coupled to the signal node MB and N throws (e.g., N=7), to support the plurality of mid-band frequency bands.

Referring to FIG. 3, the high-band operations can be achieved with, for example, a high-band (HB) power amplifier module integrated duplexer (PAMiD) block 24 configured to support a plurality of high-band frequency bands for transmission through a signal node HB. In some embodiments, the HB block 24 can support receive operations with its duplexer functionality. In some embodiments, the HB block 24 can include a switch 25 having a pole coupled to the signal node HB and N throws (e.g., N=6), to support the plurality of high-band frequency bands.

Examples related to some or all of the foregoing ULCA block 20, MIMO Rx block 22, HB PAMiD block 24, MB PAMiD block 26, and LB PAMiD block 28 can be found in U.S. Publication No. 2018/0019768 titled UPLINK CARRIER AGGREGATION FRONT-END ARCHITECTURE THAT SUPPORTS SIMULTANEOUS MIMO, which is expressly incorporated by reference in its entirely, and its disclosure is to be considered part of the specification of the present application.

Referring to FIG. 3, the triplexing front-end architecture 10 includes a triplexer 11 having a low-band filter (LB), a mid-band filter (MB), and a high-band filter (HB). The triplexer 11 is shown to have a common connection node on the antenna side, and each of the low, mid and high-band filters is shown to have a respective connection node on the other side. Thus, the connection node of the low-band filter is shown to be coupled to the signal node (LB) of the low-band PAMiD block 28, through a signal path 15 and a corresponding node LB_IN. Similarly, the connection node of the mid-band filter is shown to be coupled to the signal node (MB) of the mid-band PAMiD block 26, through a signal path 14 and a corresponding node MB_IN. Similarly, the connection node of the high-band filter is shown to be coupled to the signal node (HB) of the high-band PAMiD block 24, through a signal path 13 and a corresponding node HB_IN.

Referring to FIG. 3, the common connection node of the triplexer 11 is shown to be connectable to the antenna 108c (ANT0) through a switch 12, a signal node ANT0_OUT, and a signal path 44. In the example of FIG. 3, the switch 12 can include a double-pole-double-throw (DP2T) functionality to foregoing connectivity between the common connection node of the triplexer 11 and the antenna 108c, or to provide an antenna swap functionality through signal paths 17, 18 and respective signal nodes AUX_IN, AUX_OUT. In some embodiments, such an antenna swap functionality can involve cross-user-equipment cables 32, 34 (collectively indicated as 30) and a diversity receive (DRx) block and a corresponding antenna. Examples related to such antenna swap functionality can be found in, for example, U.S. Publication No. 2016/0365908 titled ANTENNA SWAP ARCHITECTURES FOR TIME-DIVISION DUPLEXING COMMUNICATION SYSTEMS, which is expressly incorporated by reference in its entirely, and its disclosure is to be considered part of the specification of the present application.

Referring to FIG. 3, some or all of the triplexing front-end architecture 10 can be controlled by a controller. For example, a mobile industry processor interface (MIPI) based controller 16 can be provided to control the switch 12. Such a controller can provide its control functionality based on, for example, I/O voltage (VIO), clock signal (CLK), control input (DATA), and supply voltage (VBATT).

In the example of FIG. 3, the triplexing front-end architecture 10 is shown to be supported by the antenna 108c. Such an antenna can be a primary antenna configured to support transmit and/or receive operations in low, mid/low, mid, and high-bands. Thus, the antenna 108c is indicated as Primary LB/MLB/MB/HB Ant (ANT0).

As mentioned above, the high-band filter of the triplexer 11 of FIG. 3 is configured to support a relatively wide frequency range (e.g., 2300 MHz-2690 MHz). In such an example frequency range, the high-band filter of the triplexer 11 can support cellular bands B30, B40, B41 and B7. As also described herein, such a wide frequency range can result in degradation of performance.

Figure 4:
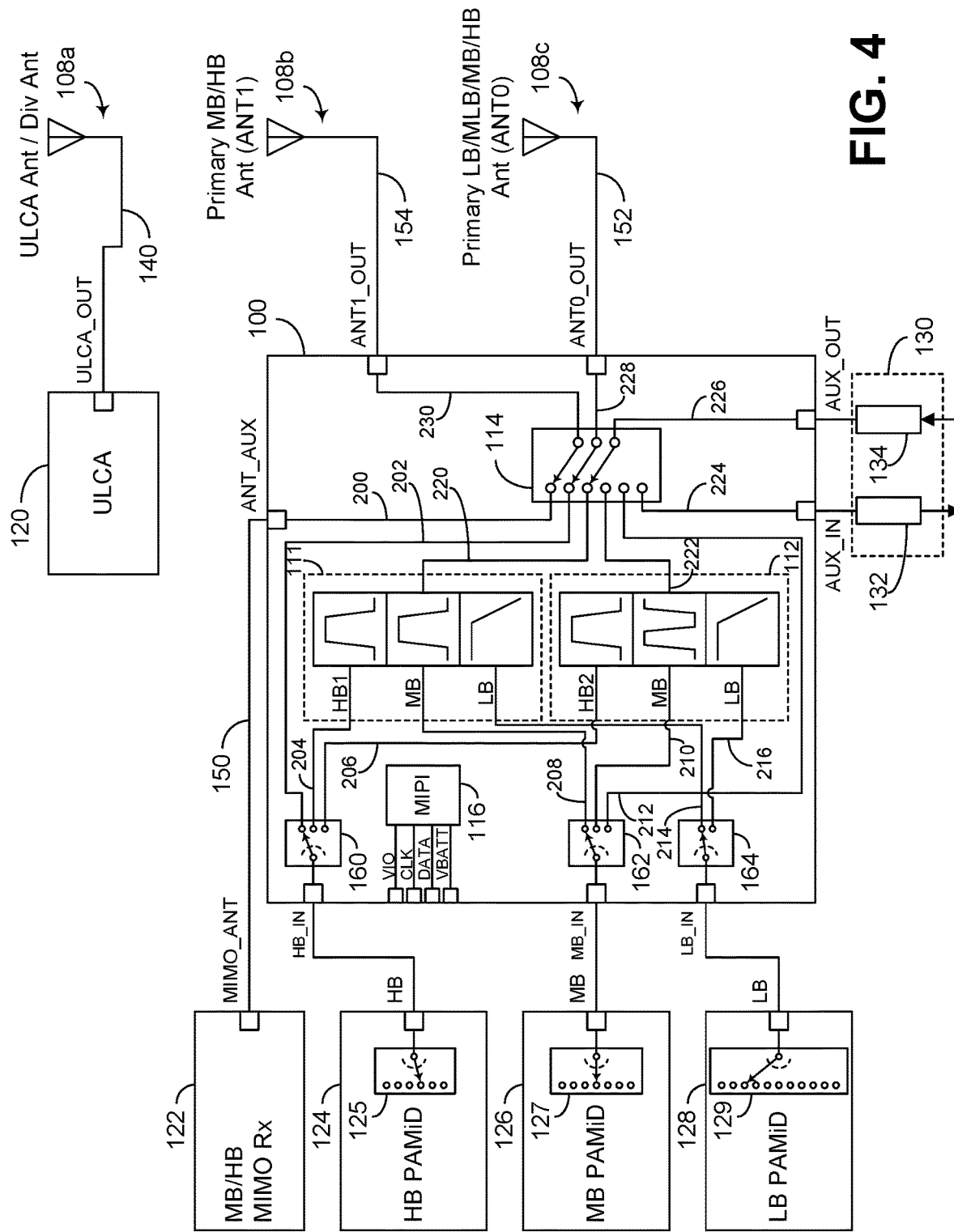
FIG. 4 shows an example front-end architecture in which the triplexer functionality of FIG. 3 can be provided by two separate triplexers to provide improved performance.

Multiplexing Architecture Having Split Triplexers:

FIG. 4 shows that in some embodiments, a multiplexing architecture 100 can be configured such that the single triplexer 11 of FIG. 3 is split into two separate optimized or appropriately-configured triplexers. For example, a first triplexer 111 can be configured for low-band (LB) operation (e.g., 698-960 MHz), mid-band (MB) operation (e.g., 1710-2200 MHz), and first high-band (HB1) operation (e.g., 2496-2690 MHz); and a second triplexer 112 can be configured for low-band (LB) (e.g., 698-960 MHz), mid-band (MB) operation (e.g., 1710-2200 MHz), and second high-band (HB2) operation (e.g., 2300-2400 MHz). In some embodiments, the second triplexer can be based on a combination of bandpass and bandstop filters for the mid-band and high-band in order to optimize insertion loss performance.

As described herein, the high-band filter of the triplexer 11 of FIG. 3 is configured to support a relatively wide frequency range (e.g., 2300 MHz-2690 MHz), thereby supporting cellular bands B30, B40, B41 and B7. In the example of FIG. 4, the first high-band filter HB1 of the first triplexer 111 can support cellular bands B41 and B7; and the second high-band filter HB2 of the second triplexer 112 can support cellular bands B40 and B30.

In the example of FIG. 4, multiple antennas are provided to support carrier aggregation (CA) and/or MIMO operations. For example, uplink (UL) carrier aggregation (CA) (ULCA) can be achieved with an ULCA block 120 and an antenna 108a, through an antenna path 140 (from an output ULCA_OUT of the ULCA block 120 to the antenna 108a). In some embodiments, such an uplink carrier aggregation configuration can be similar to the corresponding example of FIG. 3.

Referring to FIG. 4, in another example, MIMO receive operations can be achieved in mid-band and high-band with a MIMO block 122 and either or both of antennas 108b and 108c. If the antenna 108b is used, signals can be routed from the antenna 108b to the MIMO block 122 through an antenna path 154, an antenna node ANT1_OUT, a signal path 230 of the multiplexing architecture 100, a switch 114, a signal path 200 of the multiplexing architecture 100, a signal node ANT_AUX, and a signal path 150. If the antenna 108c is used, signals can be routed from the antenna 108c to the MIMO block 122 through an antenna path 152, an antenna node ANT0_OUT, a signal path 228 of the multiplexing architecture 100, the switch 114, the signal path 200 of the multiplexing architecture 100, the signal node ANT_AUX, and the signal path 150. In some embodiments, the antennas 108b and 108c can be similar to the respective antennas of the example of FIG. 3.

Referring to FIG. 4, in another example, the front-end architecture 100 can be utilized to support various transmit and/or receive operations, including carrier aggregation and non-carrier aggregation operations and/or MIMO operations, for low, mid and high-bands. The low-band operations can be achieved with, for example, a low-band (LB) power amplifier module integrated duplexer (PAMiD) block 128 configured to support a plurality of low-band frequency bands for transmission through a signal node LB. In some embodiments, the LB block 128 can support receive operations with its duplexer functionality. In some embodiments, the LB block 128 can include a switch 129 having a pole coupled to the signal node LB and N throws (e.g., N=11), to support the plurality of low-band frequency bands.

Referring to FIG. 4, the mid-band operations can be achieved with, for example, a mid-band (MB) power amplifier module integrated duplexer (PAMiD) block 126 configured to support a plurality of mid-band frequency bands for transmission through a signal node MB. In some embodiments, the MB block 126 can support receive operations with its duplexer functionality. In some embodiments, the MB block 126 can include a switch 127 having a pole coupled to the signal node MB and N throws (e.g., N=7), to support the plurality of mid-band frequency bands.

Referring to FIG. 4, the high-band operations can be achieved with, for example, a high-band (HB) power amplifier module integrated duplexer (PAMiD) block 124 configured to support a plurality of high-band frequency bands for transmission through a signal node HB. In some embodiments, the HB block 124 can support receive operations with its duplexer functionality. In some embodiments, the HB block 124 can include a switch 125 having a pole coupled to the signal node HB and N throws (e.g., N=6), to support the plurality of high-band frequency bands.

In some embodiments, the foregoing blocks 122, 124, 126 and 128 can be similar to the corresponding blocks 22, 24, 26 and 28 of the example of FIG. 3. Thus, examples related to some or all of the foregoing ULCA block 120, MIMO Rx block 122, HB PAMiD block 124, MB PAMiD block 126, and LB PAMiD block 128 can be found in the above-mentioned U.S. Publication No. 2018/0019768.

Referring to FIG. 4, the first triplexer 111 is shown to have a common connection node on the antenna side, and each of the low, mid and high-band (HB1) filters is shown to have a respective connection node on the other side. Similarly, the second triplexer 112 is shown to have a common connection node on the antenna side, and each of the low, mid and high-band (HB2) filters is shown to have a respective connection node on the other side.

For low-band operations, the LB PAMiD block 128 can be coupled to the low-band filter of the first triplexer 111, or to the low-band filter of the second triplexer 112. For the former configuration, the signal node (LB) of the LB PAMiD block 128 is shown to be coupled to a pole of a switch 164 (e.g., SP2T) through a node LB_IN, and the pole can be connected to a first throw which is coupled (through a signal path 214) to the connection node of the low-band filter of the first triplexer 111. For the latter configuration, the pole of the switch 164 can be connected to a second throw which is coupled (through a signal path 216) to the connection node of the low-band filter of the second triplexer 112.

For mid-band operations, the MB PAMiD block 126 can be coupled to the mid-band filter of the first triplexer 111, to the mid-band filter of the second triplexer 112, or to an antenna bypassing the triplexers 111, 112. For the first configuration, the signal node (MB) of the MB PAMiD block 126 is shown to be coupled to a pole of a switch 162 (e.g., SP3T) through a node MB_IN, and the pole can be connected to a first throw which is coupled (through a signal path 208) to the connection node of the mid-band filter of the first triplexer 111. For the second configuration, the pole of the switch 162 can be connected to a second throw which is coupled (through a signal path 210) to the connection node of the mid-band filter of the second triplexer 112. For the third configuration, the pole of the switch 162 can be connected to a third throw which is coupled (through a signal path 212) to the switch 114 while bypassing the first and second triplexers 111, 112.

For high-band operations, the HB PAMiD block 124 can be coupled to the first high-band filter (HB1) of the first triplexer 111, to the second high-band filter (HB2) of the second triplexer 112, or to an antenna bypassing the triplexers 111, 112. For the first configuration, the signal node (HB) of the HB PAMiD block 124 is shown to be coupled to a pole of a switch 160 (e.g., SP3T) through a node HB_IN, and the pole can be connected to a second throw which is coupled (through a signal path 204) to the connection node of the first high-band filter (HB1) of the first triplexer 111. For the second configuration, the pole of the switch 160 can be connected to a third throw which is coupled (through a signal path 206) to the connection node of the second high-band filter (HB2) of the second triplexer 112. For the third configuration, the pole of the switch 160 can be connected to a first throw which is coupled (through a signal path 202) to the switch 114 while bypassing the first and second triplexers 111, 112.

Referring to FIG. 4, the common connection node of the first triplexer 111 is shown to be connectable to either or both of the antennas 108b (ANT1) and 108c (ANT0) through the switch 114. For the antenna 108b, such a connection can be made through a first pole of the switch 114, a signal path 230, a signal node ANT1_OUT, and an antenna path 154. For the antenna 108c, such a connection can be made through a second pole of the switch 114, a signal path 228, a signal node ANT0_OUT, and an antenna path 152.

In the example of FIG. 4, the switch 114 can include a 3-pole-6-throw (3P6T) functionality. As described above, the first and second poles can be coupled to the antennas 108b, 108c. One of the six throws and a third pole of the switch 114 can be utilized to provide an antenna swap functionality through signal paths 224, 226 and respective signal nodes AUX_IN, AUX_OUT. In some embodiments, such an antenna swap functionality can involve cross-user-equipment cables 132, 134 (collectively indicated as 130) and a diversity receive (DRx) block and a corresponding antenna, similar to the example of FIG. 3. Thus, examples related to such antenna swap functionality can be found in the above-mentioned U.S. Publication No. 2016/0365908.

Referring to FIG. 4, the remaining five of the six throws of the switch 114 can be coupled to the above-described signal path 200 associated with the MIMO Rx block 122, the above-described bypass path 202 associated with the HB PAMiD block 124, a signal path 220 associated with the common connection node of the first triplexer 111, a signal path 222 associated with the common connection node of the second triplexer 112, and the above-described bypass path 212 associated with the MB PAMiD block 126.

Referring to FIG. 4, some or all of the multiplexing architecture 100 can be controlled by a controller. For example, a mobile industry processor interface (MIPI) based controller 116 can be provided to control the switches 160, 162, 164 and 114. Such a controller can provide its control functionality based on, for example, I/O voltage (VIO), clock signal (CLK), control input (DATA), and supply voltage (VBATT).

In the example of FIG. 4, the multiplexing architecture 100 is shown to be supported by the antennas 108b and 108c. In some embodiments, such antennas can be similar to the corresponding antennas of the example of FIG. 3.

As mentioned above, the first high-band filter (HB1) of the first triplexer 111 of FIG. 4 is configured to support a frequency range that is smaller than the high-band frequency range of the single triplexer 11 of FIG. 3. Similarly, the second high-band filter (HB2) of the second triplexer 112 of FIG. 4 is configured to support another frequency range that is also smaller than the high-band frequency range of the single triplexer 11 of FIG. 3. In such example frequency ranges, the first high-band filter (HB1) of the first triplexer 111 can support cellular bands B41 and B7; and the second high-band filter (HB2) of the second triplexer 112 can support cellular bands B30 and B40. As also described herein, such narrower frequency ranges associated with split triplexers can result in improvement of performance.

In the example architecture of FIG. 3, the antenna swap switch assembly (12) is required to connect to different antennas if loading conditions make one antenna less favorable for transmission. In some embodiments, such a switch assembly can be configured to enable connection of more than one triplexer in a multiplexing architecture such as in the example of FIG. 4. The additional pole(s) and/or throw(s) implemented on such a switch that is already dedicated in the architecture does not have significant impact on performance.

Figure 5:
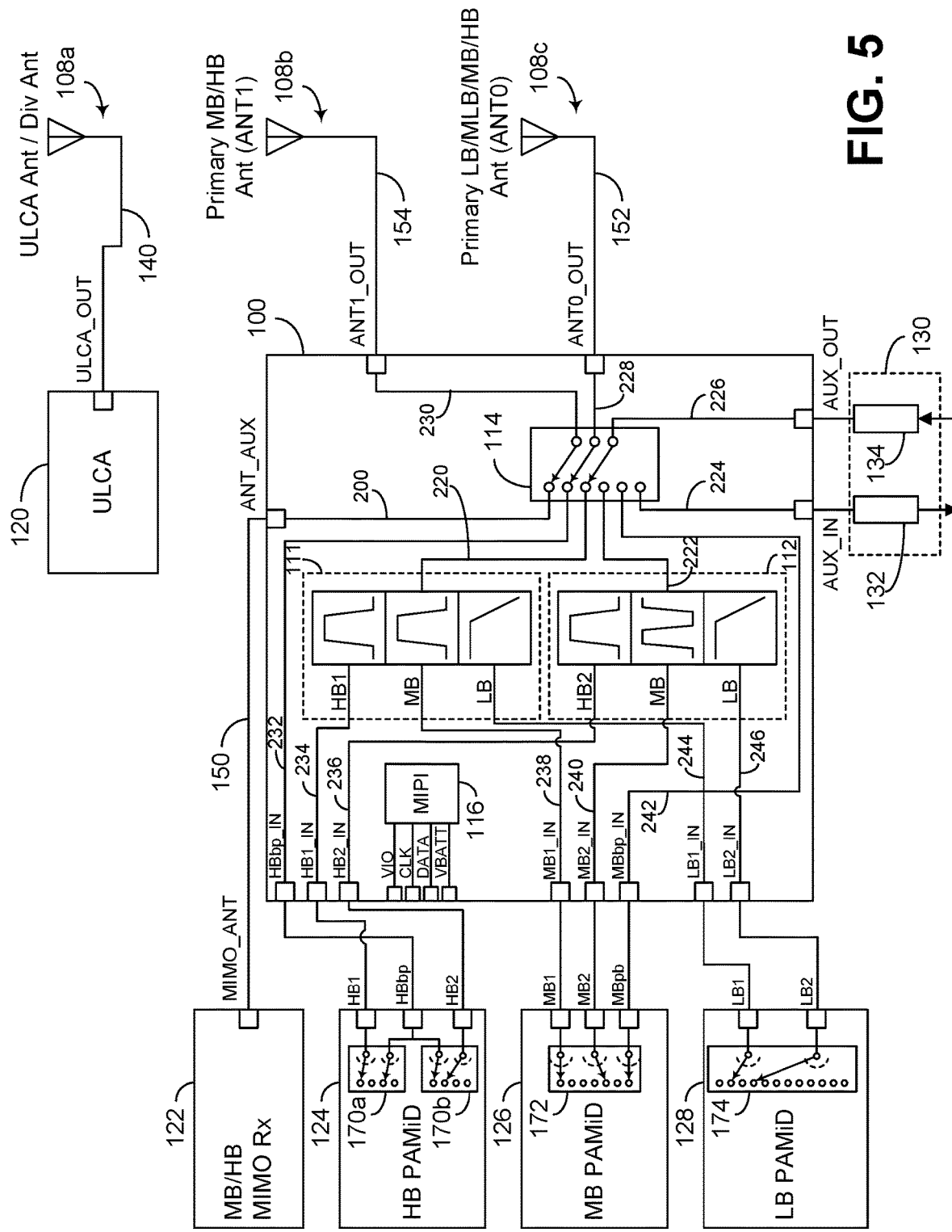
FIG. 5 shows an example of a variation of the front-end architecture of FIG. 4, in which losses can be reduced.

FIG. 5 shows that in some embodiments, a front-end architecture can be further optimized to reduce switch losses by providing more outputs from the PAiD blocks (e.g., some or all of the LB, MB and HB PAiD blocks 128, 126, 124). Such increased number of outputs can be achieved by providing appropriate switches in respective blocks. Such increased number of outputs in the PAiD blocks can allow elimination or reduction of the filter/bypass selection switches inside the triplexing architecture 100. In such a configuration, overall switch losses can be significantly reduced.

In the example of FIG. 5 the ULCA block 120, the MIMO Rx block 122, the first and second triplexers 111, 112, and the signal routing configuration on the antenna side can be similar to the respective examples of FIG. 4. In the example of FIG. 5, however, the filter/bypass selection switches (160, 162, 164) are absent in the multiplexing architecture 100. Instead, functionalities associated with such selection switches can be implemented in switches associated with the PAiD blocks (124, 126, 128).

For example, the HB PAMiD block 124 can include first and second switches 170a, 170b, with each including two poles and multiple throws. The first switch 170a can be utilized to route signals to the first high-band filter (HB1) of the first triplexer 111, or to route signals to a bypass path. Similarly, the second switch 170b can be utilized to route signals to the second high-band filter (HB2) of the second triplexer 112, or to route signals to a bypass path.

More particularly, one of the two poles of the first switch 170a can be coupled to the first high-band filter (HB1) of the first triplexer 111, through a signal node HB1 of the HB PAMiD block 124, a signal node HB1_IN of the multiplexing architecture 100, and a signal path 234. Similarly, one of the two poles of the second switch 170b can be coupled to the second high-band filter (HB2) of the second triplexer 112, through a signal node HB2 of the HB PAMiD block 124, a signal node HB2_IN of the multiplexing architecture 100, and a signal path 236. The other pole of the first switch 170a and the other pole of the second switch 170b can be connected together to provide a bypass path to the switch 114, through a signal node HBbp, through a signal node HBbp_IN of the multiplexing architecture 100, and a signal path 232.

Referring to FIG. 5, for mid-band operations, the MB PAMiD block 126 can include a switch 172 having three poles and multiple throws. The first and second poles can be utilized to route signals to the mid-band filters of the respective triplexers 111, 112; and the third pole can be utilized to route signals to a bypass path.

More particularly, the first pole of the switch 172 can be coupled to the mid-band filter of the first triplexer 111, through a signal node MB1 of the MB PAMiD block 126, a signal node MB1_IN of the multiplexing architecture 100, and a signal path 238. Similarly, the second pole of the switch 172 can be coupled to the mid-band filter of the second triplexer 112, through a signal node MB2 of the MB PAMiD block 126, a signal node MB2_IN of the multiplexing architecture 100, and a signal path 240. The third pole of the switch 172 can be coupled to a bypass path 242 and to the switch 114, through a signal node MBbp, and a signal node MBbp_IN of the multiplexing architecture 100.

Referring to FIG. 5, for low-band operations, the LB PAMiD block 128 can include a switch 174 having two poles and multiple throws. The first and second poles can be utilized to route signals to the low-band filters of the respective triplexers 111, 112.

More particularly, the first pole of the switch 174 can be coupled to the low-band filter of the first triplexer 111, through a signal node LB1 of the LB PAMiD block 128, a signal node LB1_IN of the multiplexing architecture 100, and a signal path 244. Similarly, the second pole of the switch 174 can be coupled to the low-band filter of the second triplexer 112, through a signal node LB2 of the LB PAMiD block 128, a signal node LB2_IN of the multiplexing architecture 100, and a signal path 246.

As described herein, the present disclosure can include a multiplexing architecture that can be configured to support all MB/HB carrier aggregation (CA) along with simultaneous MIMO in MB and HB. As also described herein, such a multiplexing architecture can be achieved by, for example, splitting a conventional triplexer (e.g., LB: 700-960 MHz, MB: 1452-2200 MHz, HB: 2300-2690 MHz) into two optimized triplexers. The first triplexer can be configured to support, for example, B41/B7 bands with LB: 700-960 MHz, MB: 1710-2200 MHz, and HB1: 2496-2690 MHz. The second triplexer can be configured to support, for example, B40/B30 bands with LB: 700-960 MHz, MB: 1710-2200 MHz, and HB2: 2300-2400 MHz. As described herein, each of such two triplexers can have lower loss than the conventional triplexer, especially for close MB/HB combinations.

In some embodiments, and as described herein, a multiplexing architecture having one or more features as described herein can include a bypass architecture configured to allow single band operation(s), as well as to allow switch-combined or ganged combinations of filters to be directly connected to the antenna with low loss.

In some embodiments, and as shown in the examples of FIGS. 4 and 5, an antenna swap functionality can be enabled for some or all merged bands by utilizing, for example, a 3P6T switch (114 in FIGS. 4 and 5).

It is noted that in some implementations of the PAiDs (e.g., a lower cost implementation), a single output can be provided for a given PAiD, and such a single connection can be provided to a multiplexing architecture having the split triplexers, such as in the example of FIG. 4. In some embodiments, additional switches (e.g., switches 160, 162, 164 in FIG. 4) can be implemented to manage such a single input of the multiplexing architecture, and provide multiple routes to the triplexers and the bypass paths.

In some embodiments, all of the transmit (Tx) signals from respective PAiDs can be enabled to be connected to a single antenna. Such functionality can be desirable if, for example, the antenna implementation requires such a feature.

Multiplexing Architecture Having Split Diplexers:

As described herein, the example front-end architecture of FIG. 3 relies on a single triplexer that supports the entire example high-band range of 2300 MHz-2690 MHz, and such a frequency range is only separated from the upper end of the example mid-band frequency range (1710 MHz-2200 MHz) by a 100 MHz gap. Accordingly, the example architecture of FIG. 3 can have significant insertion loss at or near the band edges where adjacent band edges are closest or sufficiently near to each other.

Figure 6:
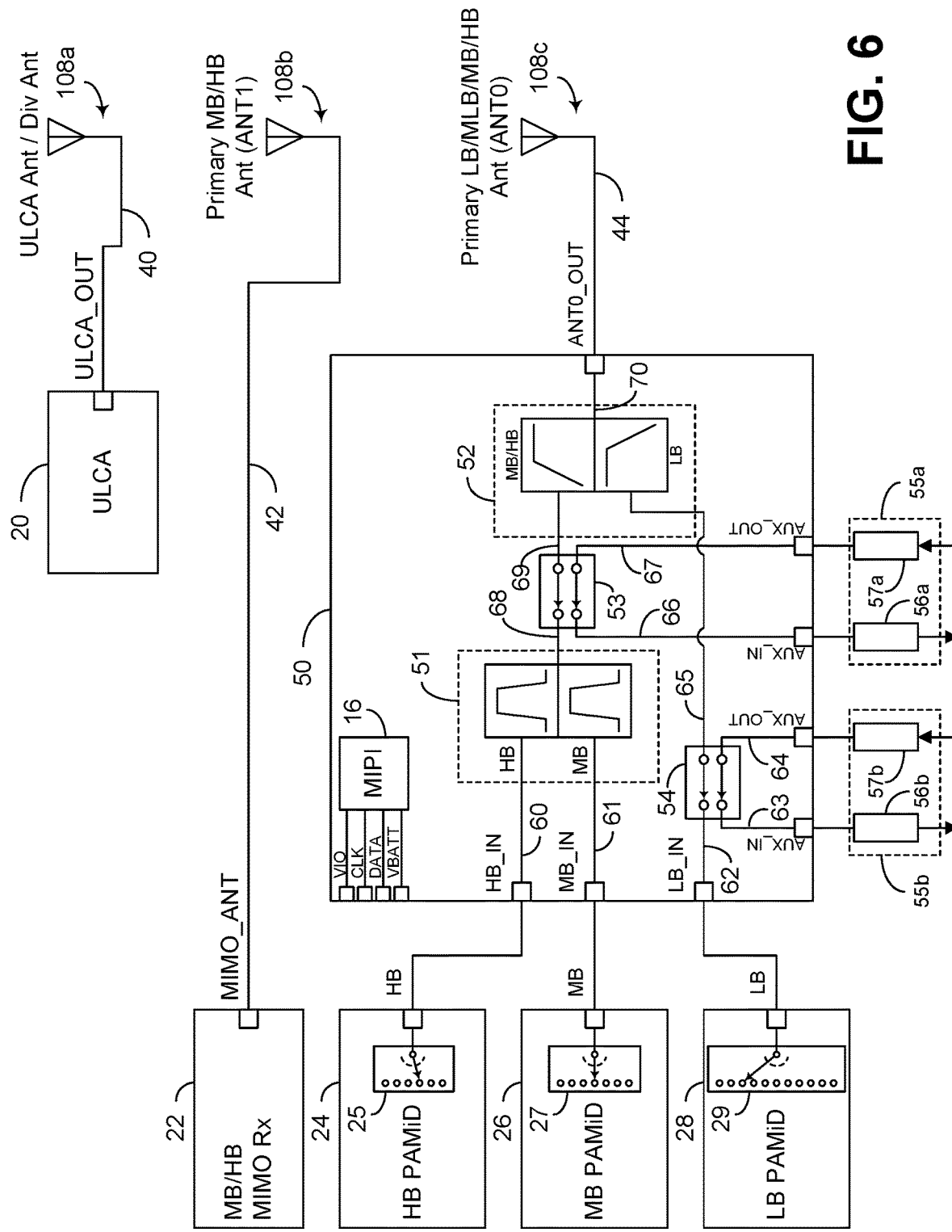
FIG. 6 shows an example front-end architecture in which an antenna swap switch is cascaded with a diplexer configured to support a mid-band (MB) and a high-band (HB), where the high-band has a large frequency range.

FIG. 6 shows an example multiplexing architecture 50 in which an antenna swap switch is cascaded with a diplexer. More particularly, a mid-band (MB)/high-band (HB) diplexer 51 capable of supporting carrier aggregation (CA) is followed by an antenna swap switch 53, and then a diplexer 52 which, among others, can properly filter low-band (LB) harmonics. In FIG. 6, such a low-band related diplexer (52) is shown to have a MB/HB filter and a LB filter.

In the example of FIG. 6, multiple antennas are provided to support carrier aggregation (CA) and/or MIMO operations. For example, uplink (UL) carrier aggregation (CA) (ULCA) can be achieved with an ULCA block 20 and an antenna 108a, through an antenna path 40 (from an output ULCA_OUT of the ULCA block 20 to the antenna 108a). In some embodiments, the antenna 108a can also be utilized as a diversity antenna. Thus, in the example of FIG. 6, the antenna 108a is indicated as ULCA Ant/Div Ant, similar to the example of FIG. 3.

Referring to FIG. 6, in another example, MIMO receive operations can be achieved in mid-band and high-band with a MIMO block 22 and an antenna 108b, through an antenna path 42 (between the antenna 108b and a node MIMO_ANT of the MIMO block 22). In some embodiments, the antenna 108b can be one of a plurality of primary antennas. Thus, in the example of FIG. 6, the antenna 108b is indicated as Primary MB/HB Ant (ANT1), similar to the example of FIG. 3.

Referring to FIG. 6, in another example, the multiplexing architecture 50 can be utilized to support various transmit and/or receive operations, including carrier aggregation and non-carrier aggregation operations and/or MIMO operations, for low, mid and high-bands. The low-band operations can be achieved with, for example, a low-band (LB) power amplifier module integrated duplexer (PAMiD) block 28 configured to support a plurality of low-band frequency bands for transmission through a signal node LB. In some embodiments, the LB block 28 can support receive operations with its duplexer functionality. In some embodiments, the LB block 28 can include a switch 29 having a pole coupled to the signal node LB and N throws (e.g., N=11), to support the plurality of low-band frequency bands.

Referring to FIG. 6, the mid-band operations can be achieved with, for example, a mid-band (MB) power amplifier module integrated duplexer (PAMiD) block 26 configured to support a plurality of mid-band frequency bands for transmission through a signal node MB. In some embodiments, the MB block 26 can support receive operations with its duplexer functionality. In some embodiments, the MB block 26 can include a switch 27 having a pole coupled to the signal node MB and N throws (e.g., N=7), to support the plurality of mid-band frequency bands.

Referring to FIG. 6, the high-band operations can be achieved with, for example, a high-band (HB) power amplifier module integrated duplexer (PAMiD) block 24 configured to support a plurality of high-band frequency bands for transmission through a signal node HB. In some embodiments, the HB block 24 can support receive operations with its duplexer functionality. In some embodiments, the HB block 24 can include a switch 25 having a pole coupled to the signal node HB and N throws (e.g., N=6), to support the plurality of high-band frequency bands.

In some embodiments, the blocks 20, 22, 24, 26 and 28 can be similar to the corresponding blocks of FIG. 3. Thus, examples related to some or all of the foregoing ULCA block 20, MIMO Rx block 22, HB PAMiD block 24, MB PAMiD block 26, and LB PAMiD block 28 can be found in the above-referenced U.S. Publication No. 2018/0019768.

Referring to FIG. 6, the multiplexing architecture 50 includes a diplexer 51 having a mid-band filter (MB) and a high-band filter (HB). The diplexer 51 is shown to have a common connection node on the antenna side, and each of the mid and high-band filters is shown to have a respective connection node on the other side. Thus, the connection node of the mid-band filter is shown to be coupled to the signal node (MB) of the mid-band PAMiD block 26, through a signal path 61 and a corresponding node MB_IN. Similarly, the connection node of the high-band filter is shown to be coupled to the signal node (HB) of the high-band PAMiD block 24, through a signal path 60 and a corresponding node HB_IN.

Referring to FIG. 6, the common connection node of the diplexer 51 is shown to be connectable to the antenna 108c (ANT0) through a signal path 68, the switch 53, a signal path 69, the MB/HB filter of the diplexer 52, a common connection node of the diplexer 52, a signal path 70, a signal node ANT0_OUT, and an antenna path 44. In the example of FIG. 6, the switch 53 can include a double-pole-double-throw (DP2T) functionality to provide the foregoing connectivity between the common connection node of the diplexer 51 and the antenna 108c, or to provide an antenna swap functionality through signal paths 66, 67 and respective signal nodes AUX_IN, AUX_OUT. In some embodiments, such an antenna swap functionality can involve cross-user-equipment cables 56a, 57a (collectively indicated as 55a) and a diversity receive (DRx) block and a corresponding antenna. Examples related to such antenna swap functionality can be found in, for example, the above-referenced U.S. Publication No. 2016/0365908.

Referring to FIG. 6, the low-band operations can be achieved with, for example, a low-band (LB) power amplifier module integrated duplexer (PAMiD) block 28 configured to support a plurality of low-band frequency bands for transmission through a signal node LB. In some embodiments, the LB block 28 can support receive operations with its duplexer functionality. In some embodiments, the LB block 28 can include a switch 29 having a pole coupled to the signal node LB and N throws (e.g., N=11), to support the plurality of low-band frequency bands.

Referring to FIG. 6, the signal node LB of the LB block 28 is shown to be connectable to the antenna 108c, through a signal node LB_IN of the multiplexing architecture 50, a signal path 62, a switch 54, a signal path 65, the LB filter of the diplexer 52, the common connection node of the diplexer 52, the signal path 70, the signal node ANT0_OUT, and the antenna path 44. In the example of FIG. 6, the switch 54 can include a double-pole-double-throw (DP2T) functionality to provide the foregoing connectivity between the LB block 28 and the antenna 108c, or to provide an antenna swap functionality through signal paths 63, 64 and respective signal nodes AUX_IN, AUX_OUT. In some embodiments, such an antenna swap functionality can involve cross-user-equipment cables 56b, 57b (collectively indicated as 55b) and a diversity receive (DRx) block and a corresponding antenna. Examples related to such antenna swap functionality can be found in, for example, the above-referenced U.S. Publication No. 2016/0365908.

Referring to FIG. 3, some or all of the multiplexing architecture 50 can be controlled by a controller. For example, a mobile industry processor interface (MIPI) based controller 16 can be provided to control the switches 53 and 54. Such a controller can provide its control functionality based on, for example, I/O voltage (VIO), clock signal (CLK), control input (DATA), and supply voltage (VBATT).

In the example of FIG. 6, the multiplexing architecture 50 is shown to be supported by the antenna 108c. Such an antenna can be a primary antenna configured to support transmit and/or receive operations in low, mid/low, mid, and high-bands. Thus, the antenna 108c is indicated as Primary LB/MLB/MB/HB Ant (ANT0), similar to the example of FIG. 3.

Similar to the example of FIG. 3, the high-band filter of the diplexer 51 of FIG. 6 is configured to support a relatively wide frequency range (e.g., 2300 MHz-2690 MHz). In such an example frequency range, the high-band filter of the diplexer 51 can support cellular bands B30, B40, B41 and B7. As also described herein, such a wide frequency range can result in degradation of performance.

It is also noted that in the example of FIG. 6, loss can occur in the series cascade of the diplexers 51 and 52. Such an overall diplexer-related loss is in general greater than a loss associated with a single stage diplexer.

Figure 7:
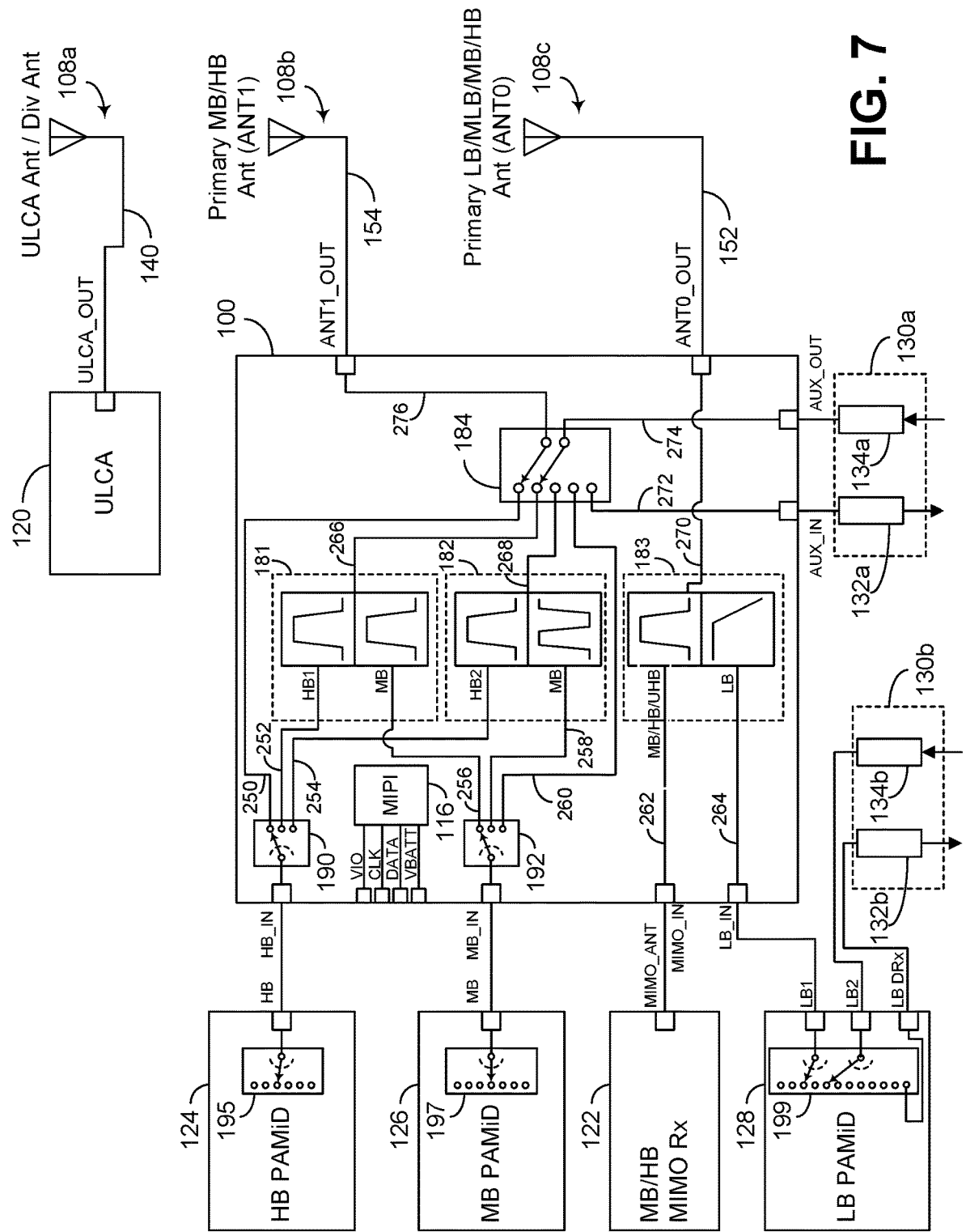
FIG. 7 shows an example front-end architecture in which the diplexer functionality of FIG. 6 can be provided by two separate diplexers to provide improved performance.

FIG. 7 shows that in some embodiments, a multiplexing architecture 100 can be configured such that the wide band supporting high-band filter of the single triplexer 11 of FIG. 3 and/or the diplexer 51 of FIG. 6 is split into two separate optimized or appropriately-configured diplexers. For example, a first diplexer 181 can be configured for mid-band (MB) operations (e.g., 1710-2200 MHz, and first high-band (HB1) operations (e.g., 2496-2690 MHz), and a second diplexer 182 can be configured for mid-band (MB) operations (e.g., 1710-2200 MHz) and second high-band (HB2) operations (e.g., 2300-2400 MHz). In some embodiments, the second diplexer 182 can be based on a combination of bandpass and bandstop filters for the mid-band and high-band in order to optimize insertion loss performance.

In the example of FIG. 7, multiple antennas are provided to support carrier aggregation (CA) and/or MIMO operations. For example, uplink (UL) carrier aggregation (CA) (ULCA) can be achieved with an ULCA block 120 and an antenna 108a, through an antenna path 140 (from an output ULCA_OUT of the ULCA block 120 to the antenna 108a). In some embodiments, such an uplink carrier aggregation configuration can be similar to the corresponding example of FIG. 6.

Referring to FIG. 7, in another example, MIMO receive operations can be achieved in mid-band and high-band with a MIMO block 122 and an antenna 108c. More particularly, signals can be routed from the antenna 108c to the MIMO block 122 through an antenna path 152, an antenna node ANT0_OUT, a signal path 270 of the multiplexing architecture 100, a MB/HB/UHB filter of a duplexer 183, a signal path 262, a signal node MIMO_IN, and a signal node MIMO_ANT of the MIMO block 122. In some embodiments, the antenna 108c can be similar to the antenna 108c of the example of FIG. 6.

Referring to FIG. 7, in another example, the front-end architecture 100 can be utilized to support various transmit and/or receive operations, including carrier aggregation and non-carrier aggregation operations and/or MIMO operations, for low, mid and high-bands. The low-band operations can be achieved with, for example, a low-band (LB) power amplifier module integrated duplexer (PAMiD) block 128 configured to support a plurality of low-band frequency bands for transmission through a signal node LB. In some embodiments, the LB block 128 can support receive operations with its duplexer functionality. In some embodiments, the LB block 128 can include a switch 199 having two poles and N throws (e.g., N=12), to support the plurality of low-band frequency bands. One of such throws can be coupled to a signal node LB_DRx.

In the example of FIG. 7, the first pole of the switch 199 can be coupled to a first signal node LB1, and the second pole of the switch 199 can be coupled to a second signal node LB2. The first signal node LB1 is shown to be coupled to the antenna 108c through a signal node LB_IN of the multiplexing architecture 100, a signal path 264, a LB filter of the duplexer 183, the signal path 270, the signal node ANT0_OUT, and the antenna path 152.

In the example of FIG. 7, the signal nodes LB_DRx and LB2 coupled to the respective throw and pole of the switch 199 can be utilized to provide an antenna swap functionality through cross-user-equipment cables 132b, 134b (collectively indicated as 130b) and a diversity receive (DRx) block and a corresponding antenna. Examples related to such antenna swap functionality can be found in, for example, the above-referenced U.S. Publication No. 2016/0365908.

Referring to FIG. 7, the mid-band operations can be achieved with, for example, a mid-band (MB) power amplifier module integrated duplexer (PAMiD) block 126 configured to support a plurality of mid-band frequency bands for transmission through a signal node MB. In some embodiments, the MB block 126 can support receive operations with its duplexer functionality. In some embodiments, the MB block 126 can include a switch 197 having a pole coupled to the signal node MB and N throws (e.g., N=7), to support the plurality of mid-band frequency bands.

Referring to FIG. 7, the high-band operations can be achieved with, for example, a high-band (HB) power amplifier module integrated duplexer (PAMiD) block 124 configured to support a plurality of high-band frequency bands for transmission through a signal node HB. In some embodiments, the HB block 124 can support receive operations with its duplexer functionality. In some embodiments, the HB block 124 can include a switch 195 having a pole coupled to the signal node HB and N throws (e.g., N=6), to support the plurality of high-band frequency bands.

In some embodiments, the foregoing blocks 122, 124, 126 and 128 can be similar to the corresponding blocks 22, 24, 26 and 28 of the example of FIG. 3. Thus, examples related to some or all of the foregoing ULCA block 120, MIMO Rx block 122, HB PAMiD block 124, MB PAMiD block 126, and LB PAMiD block 128 can be found in the above-mentioned U.S. Publication No. 2018/0019768.

Referring to FIG. 7, the first diplexer 181 is shown to have a common connection node on the antenna side, and each of the mid and high-band (HB1) filters is shown to have a respective connection node on the other side. Similarly, the second diplexer 182 is shown to have a common connection node on the antenna side, and each of the mid and high-band (HB2) filters is shown to have a respective connection node on the other side.

For mid-band operations, the MB PAMiD block 126 can be coupled to the mid-band filter of the first diplexer 181, to the mid-band filter of the second diplexer 182, or to an antenna bypassing the diplexers 181, 182. For the first configuration, the signal node (MB) of the MB PAMiD block 126 is shown to be coupled to a pole of a switch 192 (e.g., SP3T) through a node MB_IN, and the pole can be connected to a first throw which is coupled (through a signal path 256) to the connection node of the mid-band filter of the first diplexer 111. For the second configuration, the pole of the switch 192 can be connected to a second throw which is coupled (through a signal path 258) to the connection node of the mid-band filter of the second diplexer 112. For the third configuration, the pole of the switch 192 can be connected to a third throw which is coupled (through a signal path 260) to the switch 184 while bypassing the first and second diplexers 181, 182.

For high-band operations, the HB PAMiD block 124 can be coupled to the first high-band filter (HB1) of the first diplexer 181, to the second high-band filter (HB2) of the second diplexer 182, or to an antenna bypassing the diplexers 181, 182. For the first configuration, the signal node (HB) of the HB PAMiD block 124 is shown to be coupled to a pole of a switch 190 (e.g., SP3T) through a node HB_IN, and the pole can be connected to a second throw which is coupled (through a signal path 252) to the connection node of the first high-band filter (HB1) of the first diplexer 181. For the second configuration, the pole of the switch 190 can be connected to a third throw which is coupled (through a signal path 254) to the connection node of the second high-band filter (HB2) of the second diplexer 182. For the third configuration, the pole of the switch 190 can be connected to a first throw which is coupled (through a signal path 250) to the switch 184 while bypassing the first and second diplexers 181, 182.

Referring to FIG. 7, the common connection node of the first diplexer 181 is shown to be connectable to the antenna 108b (ANT1) through the switch 184. Such a connection can be made through a first pole of the switch 184, a signal path 276, a signal node ANT1_OUT, and an antenna path 154.

In the example of FIG. 7, the switch 184 can include a 2-pole-5-throw (DPST) functionality. As described above, the first pole can be coupled to the antenna 108b. One of the five throws and the second pole of the switch 184 can be utilized to provide an antenna swap functionality through signal paths 272, 274 and respective signal nodes AUX_IN, AUX_OUT. In some embodiments, such an antenna swap functionality can involve cross-user-equipment cables 132a, 134a (collectively indicated as 130a) and a diversity receive (DRx) block and a corresponding antenna, similar to the example of FIG. 4. Thus, examples related to such antenna swap functionality can be found in the above-mentioned U.S. Publication No. 2016/0365908.

Referring to FIG. 7, the remaining four of the five throws of the switch 184 can be coupled to the above-described bypass path 250 associated with the HB PAMiD block 124, a signal path 266 associated with the common connection node of the first diplexer 181, a signal path 268 associated with the common connection node of the second diplexer 182, and the above-described bypass path 260 associated with the MB PAMiD block 126.

Referring to FIG. 7, some or all of the multiplexing architecture 100 can be controlled by a controller. For example, a mobile industry processor interface (MIPI) based controller 116 can be provided to control the switches 190, 192 and 184. Such a controller can provide its control functionality based on, for example, I/O voltage (VIO), clock signal (CLK), control input (DATA), and supply voltage (VBATT).

In the example of FIG. 7, the multiplexing architecture 100 is shown to be supported by the antennas 108b and 108c. In some embodiments, such antennas can be similar to the corresponding antennas of the example of FIG. 3.

As mentioned above, the first high-band filter (HB1) of the first diplexer 181 of FIG. 7 is configured to support a frequency range that is smaller than the high-band frequency range of the single triplexer 11 of FIG. 3, as well as the high-band frequency range of the diplexer 51 of FIG. 6. Similarly, the second high-band filter (HB2) of the second diplexer 182 of FIG. 7 is configured to support another frequency range that is also smaller than the high-band frequency range of the single triplexer 11 of FIG. 3, as well as the high-band frequency range of the diplexer 51 of FIG. 6. In such example frequency ranges, the first high-band filter (HB1) of the first diplexer 181 can support cellular bands B41 and B7; and the second high-band filter (HB2) of the second diplexer 182 can support cellular bands B30 and B40. As also described herein, such narrower frequency ranges associated with split triplexers can result in improvement of performance.

It is noted that in each of the example architectures of FIGS. 3 and 6, an antenna swap switch assembly is provided (e.g., 12 in FIG. 3, and 53 in FIG. 6) to connect to different antennas if loading conditions make one antenna less favorable for transmission. In some embodiments, and as described above, such a switch assembly can be configured to enable connection of more than one diplexer in a multiplexing architecture such as in the example of FIG. 7. The additional throw(s) implemented on such a switch that is already dedicated in the architecture typically does not have significant impact on performance.

It is noted that in the example multiplexing architecture 100 of FIG. 7 (when compared to the example of FIG. 6), the low-band associated with the LB PAMiD block 128 is combined in diplex with the MB/HB Rx MIMO block 122 instead of the MB/HB Tx/Rx of the PAiD blocks 126, 124. It is further noted that the combining of the LB PAMiD block 128 with the MB/HB MIMO Rx block 122 as described herein does not require a MB/HB carrier aggregation duplex support. For example, Rx-only filters can be utilized for signals associated with the MIMO Rx block 122 because of the relaxed requirements. Further, no series cascade of multiple duplexing is present to add excess loss.

Referring to FIG. 7, in some embodiments, the MB/HB carrier aggregation split-diplexers configuration of the multiplexing architecture 100 can be implemented for dedicated connection to the second MB/HB antenna (Ant1), and all simultaneous carrier aggregation and DL MIMO (e.g., 4×4) operations can be supported with less loss, and with an added advantage of sufficient LB harmonic filtering. With respect to the switch 184, the additional throws utilized on that switch for the split diplexers 181, 182 can be part of, or an extension of, a switch assembly that is already dedicated in the architecture; thus implementation of such additional throws does not have significant impact on performance.

Figure 8:
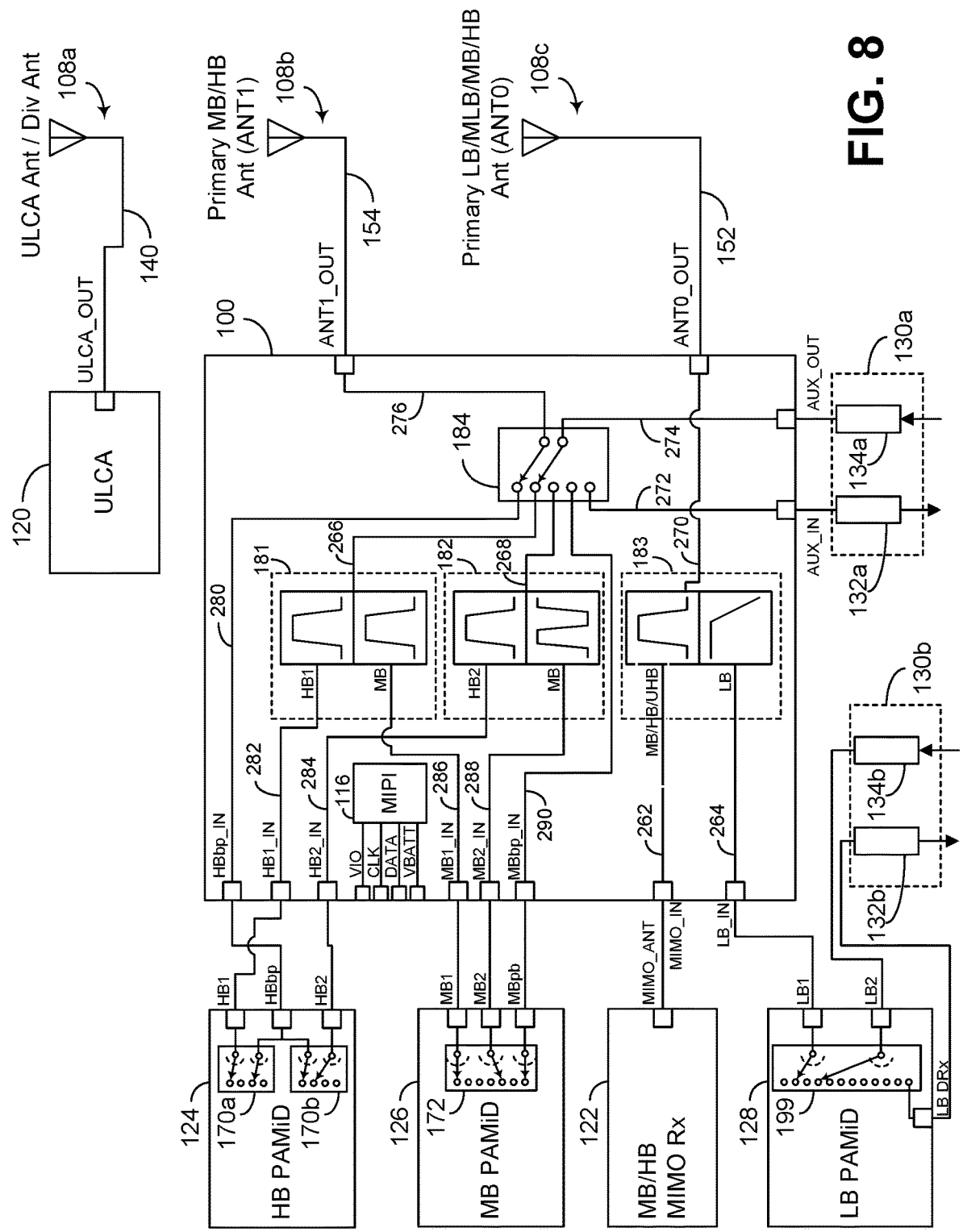
FIG. 8 shows an example of a variation of the front-end architecture of FIG. 7, in which losses can be reduced.

FIG. 8 shows that in some embodiments, a front-end architecture can be further optimized to reduce switch losses by providing more outputs from the PAiD blocks (e.g., some or all of the MB and HB PAiD blocks 126, 124). Such increased number of outputs can be achieved by providing appropriate switches in respective blocks. Such increased number of outputs in the PAiD blocks can allow elimination or reduction of the filter/bypass selection switches inside the multiplexing architecture 100. In such a configuration, overall switch losses can be significantly reduced.

In the example of FIG. 8 the ULCA block 120, the MIMO Rx block 122, the first and second diplexers 181, 182, the LB PAMiD block 128, the duplexer 183, and the signal routing configuration on the antenna side can be similar to the respective examples of FIG. 7. In the example of FIG. 8, however, the filter/bypass selection switches (190, 192 in FIG. 7) are absent in the multiplexing architecture 100. Instead, functionalities associated with such selection switches can be implemented in switches associated with the HB and MB PAiD blocks (124, 126).

For example, the HB PAMiD block 124 can include first and second switches 170a, 170b, with each including two poles and multiple throws, similar to the example of FIG. 5. The first switch 170a can be utilized to route signals to the first high-band filter (HB1) of the first diplexer 181, or to route signals to a bypass path. Similarly, the second switch 170b can be utilized to route signals to the second high-band filter (HB2) of the second diplexer 182, or to route signals to a bypass path.

More particularly, one of the two poles of the first switch 170a can be coupled to the first high-band filter (HB1) of the first diplexer 181, through a signal node HB1 of the HB PAMiD block 124, a signal node HB1_IN of the multiplexing architecture 100, and a signal path 282. Similarly, one of the two poles of the second switch 170b can be coupled to the second high-band filter (HB2) of the second diplexer 182, through a signal node HB2 of the HB PAMiD block 124, a signal node HB2_IN of the multiplexing architecture 100, and a signal path 284. The other pole of the first switch 170a and the other pole of the second switch 170b can be connected together to provide a bypass path to the switch 184, through a signal node HBbp, through a signal node HBbp_IN of the multiplexing architecture 100, and a signal path 280.

Referring to FIG. 8, for mid-band operations, the MB PAMiD block 126 can include a switch 172 having three poles and multiple throws, similar to the example of FIG. 5. The first and second poles can be utilized to route signals to the mid-band filters of the respective diplexers 181, 182; and the third pole can be utilized to route signals to a bypass path.

More particularly, the first pole of the switch 172 can be coupled to the mid-band filter of the first diplexer 181, through a signal node MB1 of the MB PAMiD block 126, a signal node MB1_IN of the multiplexing architecture 100, and a signal path 286. Similarly, the second pole of the switch 172 can be coupled to the mid-band filter of the second diplexer 182, through a signal node MB2 of the MB PAMiD block 126, a signal node MB2_IN of the multiplexing architecture 100, and a signal path 288. The third pole of the switch 172 can be coupled to a bypass path 290 and to the switch 184, through a signal node MBbp, and a signal node MBbp_IN of the multiplexing architecture 100.

As described herein, the present disclosure can include a multiplexing architecture that can be configured to provide MB/HB carrier aggregation (CA) and MIMO in MB and HB, with LB harmonics sufficiently filtered and with a reduced insertion loss (when compared to architectures that force series cascade of more than one diplexer). As also described herein, such a multiplexing architecture can be achieved by, for example, splitting a conventional triplexer (e.g., LB: 700-960 MHz, MB: 1452-2200 MHz, HB: 2300-2690 MHz), or a conventional diplexer (e.g., MB: 1452-2200 MHz, HB: 2300-2690 MHz), into two optimized diplexers. The first diplexer can be configured to support, for example, B41/B7 bands with MB: 1710-2200 MHz, and HB1: 2496-2690 MHz. The second diplexer can be configured to support, for example, B40/B30 bands with MB: 1710-2200 MHz, and HB2: 2300-2400 MHz. As described herein, each of such two diplexers can have lower loss than the conventional triplexer, as well as the conventional diplexer.

In some embodiments, and as described herein, a multiplexing architecture having one or more features as described herein can include a feature where a low-band is combined with a MIMO Rx MB/HB block (e.g., a diversity Rx (DRx) module) to enable harmonic filtering of the LB harmonics for harmonic rejection and improved performance in harmonically related DL CA configurations. As also described herein, an antenna swap switch can generate harmonics and typically cannot support extremely low harmonic levels required or desired for optimum performance if a low-band signal is routed through the antenna swap switch without a low-pass filter after the switch. A multiplexing architecture having one or more features as described herein can solve such an issue.

In some embodiments, and as described herein, a multiplexing architecture having one or more features as described herein can include a bypass architecture configured to allow single band operation(s), as well as to allow switch-combined or ganged combinations of filters to be directly connected to the antenna with low loss.

In some embodiments, and as described herein, a multiplexing architecture such as the example of FIG. 7 can provide a simpler PAiD switching design with fewer routes to the split-diplexers assembly, with some penalty for insertion loss, but with a lower cost associated with the PAiD.

In some embodiments, and as described herein, a multiplexing architecture having one or more features as described herein can include a feature where an antenna swap is enabled for some or all merged bands using, for example, a DP5T switch (e.g., as shown in the example of FIG. 7). Such an architecture can allow for the MB/HB PAiD Tx and LB antenna swap to be managed separately with optimum implementation in the LB PAiD switching configuration in PAiDs designed to support multiple outputs at a reduced insertion loss, to manage the multiple routes to the diplexers and bypass route(s).

Multiplexing Architecture Having a Quadplexer:

As described herein, the example front-end architecture of FIG. 3 relies on a single triplexer that supports the entire example high-band range of 2300 MHz-2690 MHz, and such a frequency range is only separated from the upper end of the example mid-band frequency range (1710 MHz-2200 MHz) by a 100 MHz gap. Accordingly, the example architecture of FIG. 3 can have significant insertion loss at or near the band edges where adjacent band edges are closest or sufficiently near to each other.

Figure 9:
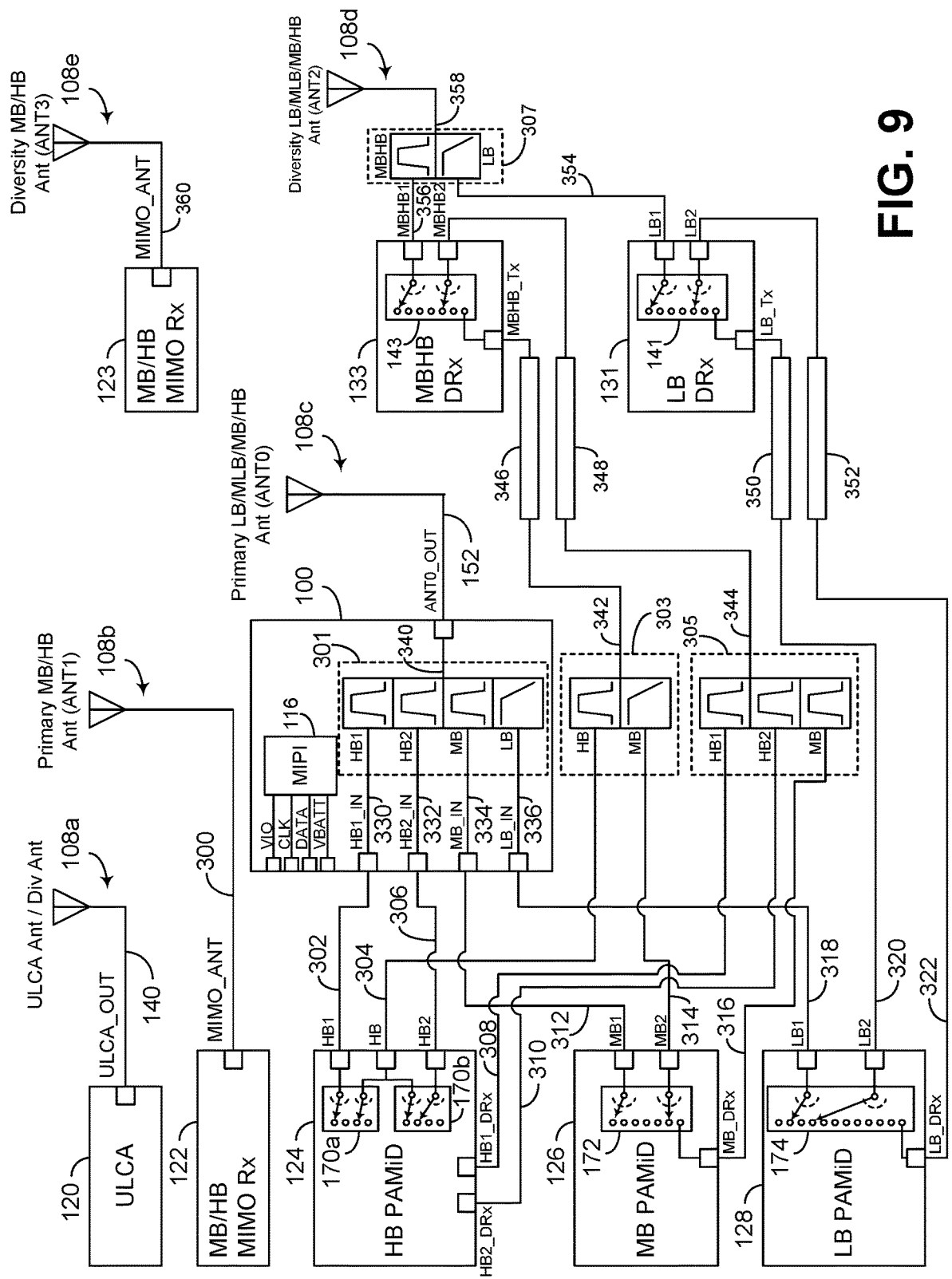
FIG. 9 shows an example front-end architecture in which the triplexer functionality of FIG. 3 can be provided by a quadplexer to provide improved performance.

FIG. 9 shows that in some embodiments, a multiplexing architecture 100 can include a quadplexer 301 having one or more features as described herein. In the example of FIG. 9, the quadplexer 301 can be configured to include two high-band filters, HB1 and HB2, to thereby split the fairly wide frequency range of the high-band filter (HB) of FIG. 3 (e.g., 2300-2690 MHz) into two separate bands (e.g., HB1 in a range of 2496-2690 MHz, and HB2 in a range of 2300-2400 MHz). Such an implementation can be utilized in an effort to, for example, reduce the loss of each of those bands. In some embodiments, such split high-bands (HB1 and HB2) can be combined with a mid-band (MB) and a low-band (LB) in the quadplexer 301.

In some embodiment, the quadplexer 301 of FIG. 9 can be configured to support the low-band in a range of 698-960 MHz, the mid-band in a range of 1710-2200 MHz, the first high-band (HB1) in a range of 2496-2690 MHz, and the second high-band (HB2) in a range of 2300-2400 MHz.

In the example of FIG. 9, multiple antennas are provided to support carrier aggregation (CA) and/or MIMO operations. For example, uplink (UL) carrier aggregation (CA) (ULCA) can be achieved with an ULCA block 120 and an antenna 108a, through an antenna path 140 (from an output ULCA_OUT of the ULCA block 120 to the antenna 108a). In some embodiments, such an uplink carrier aggregation configuration can be similar to the corresponding example of FIG. 3.

Referring to FIG. 9, in another example, MIMO receive operations can be achieved in mid-band and high-band with a MIMO block 122 and an antenna 108b. More particularly, signals can be routed from the antenna 108b to the MIMO block 122 through an antenna path 300 and a signal node MIMO_ANT.

In the example of FIG. 9, another MIMO block 123 can support receive operations in mid-band and high-band with an antenna 108e, through an antenna path 360. In some embodiments, such an antenna (108e) can be a diversity antenna (ANT3) configured to support mid and high-bands.

Referring to FIG. 9, various power amplifier module integrated duplexer (PAMiD) blocks can be provided to support low-band, mid-band, and high-band operations. The low-band operations can be supported by a low-band (LB) power amplifier module integrated duplexer (PAMiD) block 128 configured to support a plurality of low-band frequency bands for transmission. In some embodiments, the LB block 128 can support receive operations with its duplexer functionality. In some embodiments, the LB block 128 can include a switch 174 having two poles and N throws (e.g., N=12), to support the plurality of low-band frequency bands as well as an antenna swapping functionality.

Referring to FIG. 9, the mid-band operations can be supported by a mid-band (MB) power amplifier module integrated duplexer (PAMiD) block 126 configured to support a plurality of mid-band frequency bands for transmission. In some embodiments, the MB block 126 can support receive operations with its duplexer functionality. In some embodiments, the MB block 126 can include a switch 172 having two poles and N throws (e.g., N=7), to support the plurality of mid-band frequency bands.

Referring to FIG. 9, the high-band operations can be supported by a high-band (HB) power amplifier module integrated duplexer (PAMiD) block 124 configured to support a plurality of high-band frequency bands for transmission. In some embodiments, the HB block 124 can support receive operations with its duplexer functionality. In some embodiments, the HB block 124 can include first and second switches 170a, 170b, with each switch having two poles and N throws (e.g., N=4), to support the plurality of high-band frequency bands.

In some embodiments, MIMO and PAMiD aspects of the foregoing blocks 122, 124, 126 and 128 can be similar to the corresponding blocks of the example of FIG. 5. Thus, examples related to some or all of the foregoing ULCA block 120, MIMO Rx block 122, HB PAMiD block 124, MB PAMiD block 126, and LB PAMiD block 128 can be found in the above-mentioned U.S. Publication No. 2018/0019768.

Referring to FIG. 9, the quadplexer 301 is shown to have a common connection node on the antenna side, and each of the low, mid, first high (HB1) and second high-band (HB2) filters is shown to have a respective connection node on the other side.

Referring to FIG. 9, a diplexer 303 can be provided. Such a diplexer can be configured to support mid and high-bands, with the high-band (HB) implemented to support the fairly wide frequency range (e.g., 2300-2690 MHz). The diplexer 303 is shown to have a common connection node on the antenna side, and each of the mid and high-band filters is shown to have a respective connection node on the other side.

Referring to FIG. 9, a triplexer 305 can be provided. Such a triplexer can be configured to support mid, first high (HB1) and second high (HB2) bands. In some embodiments, the first and second high-band filters (HB1, HB2) can have split frequency ranges similar to the quadplexer 301. The triplexer 305 is shown to have a common connection node on the antenna side, and each of the mid, first high and second high-band filters is shown to have a respective connection node on the other side.

For low-band operations, the LB PAMiD block 128 can be coupled to an antenna 108c (Primary LB/MLB/MB/HB Ant (ANT0)), or to an antenna 108d (Diversity LB/MLB/MB/HB Ant (ANT2)). For the former connectivity configuration, a first signal node (LB1, which is coupled to the first pole of the switch 174) of the LB PAMiD block 128 is shown to be coupled to the LB filter of the quadplexer 301, through a signal path 318, a node LB_IN of the multiplexing architecture 100, and a signal path 336. For the latter connectivity configuration, a second signal node (LB2, which is coupled to the second pole of the switch 174) of the LB PAMiD block 128 is shown to be connectable to the antenna 108d through a signal path 320, a cross-user equipment cable 350, a LB DRx block 131, a signal path 354, a LB filter of a diplexer 307, and an antenna path 358.

For mid-band operations, the MB PAMiD block 126 can be coupled to the antenna 108c, or to the antenna 108d. For the former connectivity configuration, a first signal node (MB1, which is coupled to the first pole of the switch 172) of the MB PAMiD block 126 is shown to be coupled to the MB filter of the quadplexer 301, through a signal path 312, a node MB_IN of the multiplexing architecture 100, and a signal path 334. For the latter connectivity configuration, a second signal node (MB2, which is coupled to the second pole of the switch 172) of the MB PAMiD block 126 is shown to be connectable to the antenna 108d through a signal path 314, the MB filter of the diplexer 303, a signal path 342, a cross-user equipment cable 346, a MBHB DRx block 133, a signal path 356, a MBHB filter of the diplexer 307, and the antenna path 358.

For high-band operations, the HB PAMiD block 124 can be coupled to the antenna 108c for each of the first and second split high-bands (HB1, HB2), or to the antenna 108d for the high-band (HB). For the HB1 connectivity configuration, a first signal node (HB1, which is coupled to one of the two poles of the switch 170a) of the HB PAMiD block 124 is shown to be coupled to the HB1 filter of the quadplexer 301, through a signal path 302, a node HB1_IN of the multiplexing architecture 100, and a signal path 330. For the HB2 connectivity configuration, a second signal node (HB2, which is coupled to one of the two poles of the switch 170b) of the HB PAMiD block 124 is shown to be coupled to the HB2 filter of the quadplexer 301, through a signal path 306, a node HB2_IN of the multiplexing architecture 100, and a signal path 332. For the HB connectivity configuration, a third signal node (HB, which is coupled to the other pole of the switch 170a and also coupled to the other pole of the switch 170b) of the HB PAMiD block 124 is shown to be connectable to the antenna 108d through a signal path 304, the HB filter of the diplexer 303, the signal path 342, the cross-user equipment cable 346, the MBHB DRx block 127, the signal path 356, the MBHB filter of the diplexer 307, and the antenna path 358.

Referring to FIG. 9, the above-referenced LB DRx block 131 can include a switch 141 having two poles and N throws. One of the N throws can be coupled to a signal node LB_Tx to support the above-described connectivity between the LB PAliD block 128 and the antenna 108d. One of the two poles can be coupled to a signal node LB1 which is coupled to the LB filter of the diplexer 307 through the signal path 354 to support the foregoing connectivity. The other of the two poles can be coupled to a signal node LB2, and such a node can be coupled to one of the throws of the switch 174 of the LB PAliD block 128, through a cross-user equipment cable 352, a signal path 322, and a signal node LB_DRx of the LB PAliD block 128. Accordingly, an antenna swap functionality can be provided with the cross-user-equipment cables 350, 352, the LB DRx block 131, and corresponding antennas. Examples related to such antenna swap functionality can be found in the above-mentioned U.S. Publication No. 2016/0365908.

Referring to FIG. 9, the above-referenced MBHB DRx block 133 can include a switch 143 having two poles and N throws. One of the N throws can be coupled to a signal node MBHB_Tx to support the above-described connectivity between the MB PAliD block 126 and the antenna 108d, as well as the above-described connectivity between the HB PAliD block 124 and the antenna 108d. One of the two poles can be coupled to a signal node MBHB1 which is coupled to the MGHB filter of the diplexer 307 through the signal path 356 to support the foregoing connectivities. Similarly, the signal node MBHB2 can be coupled to a signal node HB1 DRx of the HB PAliD block 124, through the cross-user equipment cable 348, the signal path 344, the HB1 filter of the triplexer 305, and a signal path 308. Similarly, the signal node MBHB2 can be coupled to a signal node HB2_DRx of the HB PAliD block 124, through the cross-user equipment cable 348, the signal path 344, the HB2 filter of the triplexer 305, and a signal path 310. Accordingly, antenna swap functionalities can be supported for respective bands with the cross-user-equipment cables 346, 348, the MGHB DRx block 133, and corresponding antennas. Examples related to such antenna swap functionalities can be found in the above-mentioned U.S. Publication No. 2016/0365908.

Referring to FIG. 9, some or all of the multiplexing architecture 100 can be controlled by a controller. For example, a mobile industry processor interface (MIPI) based controller 116 can be provided to control the various switches that are coupled or connectable to the multiplexing architecture 100. Such a controller can provide its control functionality based on, for example, I/O voltage (VIO), clock signal (CLK), control input (DATA), and supply voltage (VBATT).

As mentioned above, the first high-band filter (HB1) of the quadplexer 301, and/or the HB1 filter of the triplexer 305 of FIG. 9 are/is configured to support a frequency range that is smaller than the high-band frequency range of the single triplexer 11 of FIG. 3. Similarly, the second high-band filter (HB2) of the quadplexer 301, and/or the HB2 filter of the triplexer 305 of FIG. 9 are/is configured to support another frequency range that is also smaller than the high-band frequency range of the single triplexer 11 of FIG. 3. In such example frequency ranges, the first high-band filter (HB1) can support cellular bands B41 and B7; and the second high-band filter (HB2) can support cellular bands B30 and B40. As also described herein, such narrower frequency ranges associated with split high-band filters can result in improvement of performance.

Referring to the example of FIG. 9, it is noted that an antenna swap functionality can be accomplished in a PAiD (e.g., a LB PAMiD 128) switch assembly (e.g., switch 174) at a much lower loss, and such a configuration can enable various example connectivity configurations of FIG. 9 behind the quadplexer 301 in order to reduce losses and avoid harmonic challenges of combining bands in carrier aggregation that are harmonically related.

It is also noted that the example multiplexing architecture of FIG. 9 can provide excellent filtering capability, and does not place the antenna swap switch directly on or near an antenna feed where the foregoing problem becomes less manageable. In the example of FIG. 9, the example antenna swap connectivities can include cross-user equipment cables shown to be connectable to the respective DRx (diversity Rx) blocks or modules located on an opposite end, or at a sufficiently distant location, of the user equipment.

As described herein, the present disclosure can include a front-end architecture that can be configured to support splitting of the HB1 (e.g., 2496-2690 MHz) above 2.4 GHz WLAN frequency and the HB2 (e.g., 2300-2400 MHz) below 2.4 GHz WLAN frequency. Accordingly, such an architecture can enable HB1-HB2 carrier aggregation support with reduced loss.

As also described herein, antenna swap for cross-user-equipment connectivity of blocks to different antennas can be accomplished using the switches of the PAiD blocks at much lower loss than cascading an additional switch.

In the various examples related to FIG. 9, a multiplexing architecture 100 is indicated as including the quadplexer 301. It will be under stood that such a multiplexing architecture can also include, for example, the triplexer 305.

Figure 10:
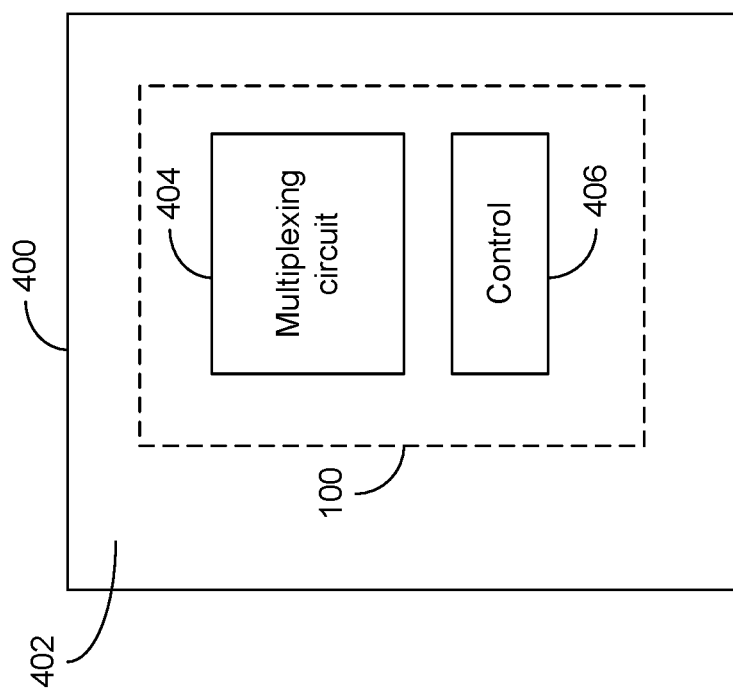
FIG. 10 shows that in some embodiments, some or all of a front-end architecture having one or more features as described herein can be implemented in a packaged module.

Examples of Product Implementations:

FIG. 10 shows that in some embodiments, one or more features of the present disclosure can be implemented in a packaged module 400. Such a module can include a packaging substrate 402 configured to support a plurality of components, circuits, etc. The module 400 can include one or more multiplexing architectures as described herein. For example, one or more of the multiplexing architectures 100 described in reference to FIGS. 1, 2, 4, 5, 7, 8 and 9 can be included in the module 400. As described herein, such a multiplexing architecture can include a multiplexing circuit 404 and a control component. In some embodiments, the multiplexing circuit 404 can include one or more multiplexers (e.g., a quadplexer, split triplexers, split diplexers) configured to support split high-bands to provide improved performance.

In some embodiments, the packaged module 400 of FIG. 10 may or may not include other functional circuits, blocks, etc. Accordingly, the packaged module 400 of FIG. 10 can be implemented as, for example, a multiplexer module, a front-end module, a switch module, etc.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 11:
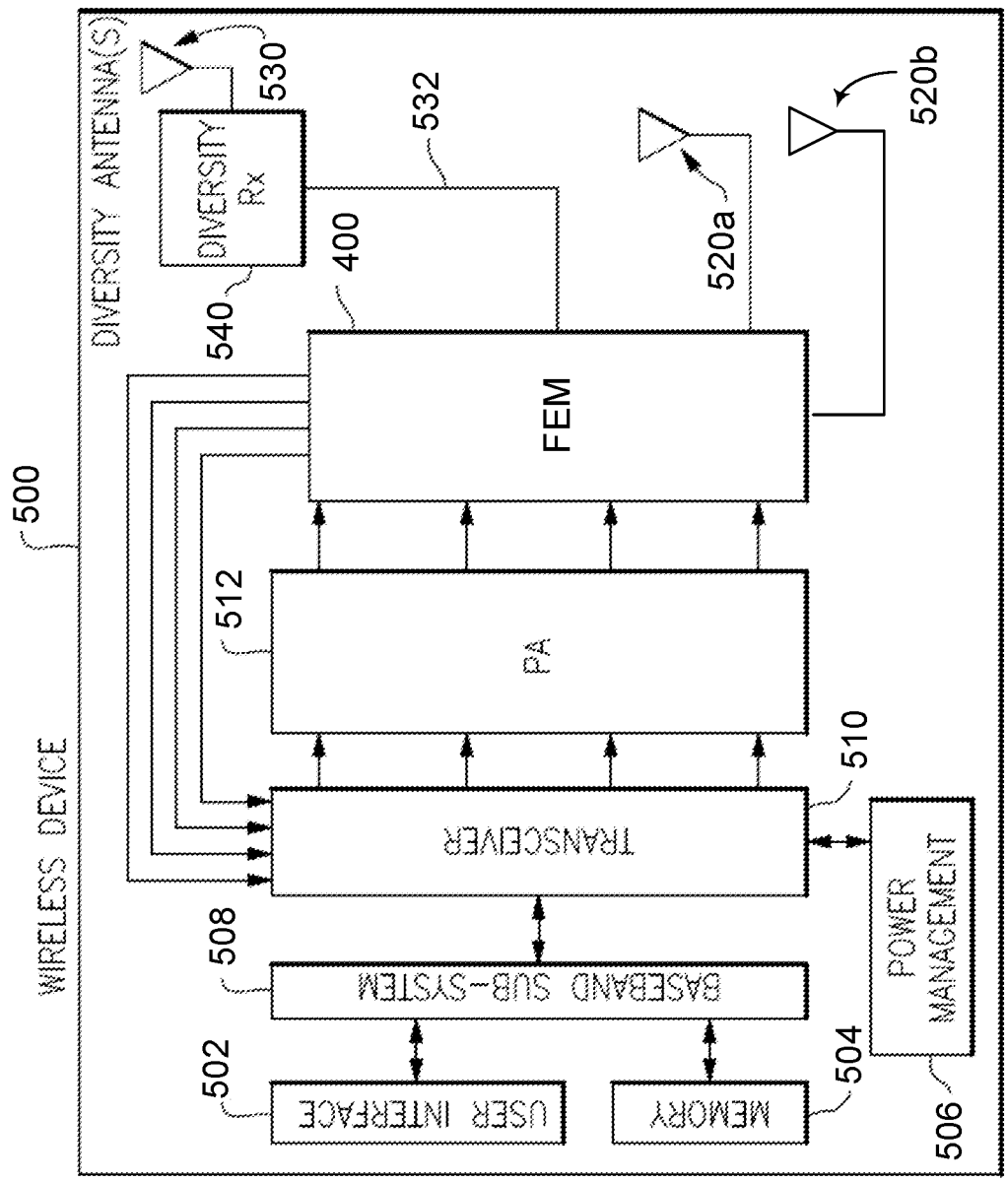
FIG. 11 depicts a wireless device having one or more features as described herein.

FIG. 11 depicts an example wireless device 500 having one or more advantageous features described herein. In some embodiments, a front-end module 400 having one or more features as described herein can be implemented in such a wireless device.

In the example of FIG. 15, power amplifiers (PAs) are depicted in a PA module 512; however, it will be understood that such power amplifiers can be implemented in one or more functional blocks, one or more devices such as die or modules, etc. Such power amplifiers can receive their respective RF signals from a transceiver 510 that can be configured and operated to generate RF signals to be amplified and transmitted, and to process received signals. The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

In the example of FIG. 15, a diversity receive (DRx) module 540 can be implemented between one or more diversity antennas (e.g., diversity antenna 530) and the front-end module 100. Such a configuration can allow an RF signal received through the diversity antenna 530 to be processed (in some embodiments, including amplification by an LNA) with little or no loss of and/or little or no addition of noise to the RF signal from the diversity antenna 530. Such processed signal from the DRx module 540 can then be routed to the front-end module 100 through one or more signal paths.

In the example of FIG. 11, a plurality of antennas (e.g., 520*a*, 520*b*) can be configured to, for example, facilitate transmission of RF signals from the PA module 512. In some embodiments, receive operations can also be achieved through some or all of the antennas 520*a*, 520*b*.

For the purpose of description, it will be understood that low band (LB), mid band (MB), and high band (HB) can include frequency bands associated with such bands. Such frequency bands can include cellular frequency bands such as the examples listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|------|------|--------------------------|--------------------------|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

GENERAL COMMENTS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. Claims and their equivalents are intended to cover such forms or modifications as would fall within the scope and spirit of the disclosure.

What is claimed is:

1. A multiplexing architecture comprising:
an assembly of filters including a first multiplexer that includes a low-band filter configured to support a low-band, a mid-band filter configured to support a mid-band, and a first high-band filter configured to support a first high-band, the assembly of filters further including a second multiplexer that includes a low-band filter configured to support the low-band, a mid-band filter configured to support the mid-band, and a second high-band filter configured to support a second high-band, each of the first and second high-band filters configured to support a respective frequency range that is smaller than a frequency range associated with a high-band filter of a single multiplexer that supports both of the first high-band and the second high-band; and
a switch assembly implemented between the assembly of filters and one or more antenna nodes.

2. The multiplexing architecture of claim 1 wherein the first high-band and the second high-band do not overlap.

3. The multiplexing architecture of claim 1 wherein the first high-band includes a frequency range of 2496-2690 MHz, and the second high-band includes a frequency range of 2300-2400 MHz.

4. The multiplexing architecture of claim 3 wherein the low-band includes a frequency range of 700-960 MHz, and the mid-band includes a frequency range of 1452-2200 MHz.

5. The multiplexing architecture of claim 3 wherein the first high-band includes cellular bands B41 and B7, and the second high-band includes cellular bands B40 and B30.

6. The multiplexing architecture of claim 1 further comprising a first node configured to receive a low-band signal, a second node configured to receive a mid-band signal, and a third node configured to receive the first high-band signal or the second high-band signal.

7. The multiplexing architecture of claim 6 further comprising a filter selection switch coupled to each of the first, second and third nodes, each filter selection switch configured to allow the respective signal received at the corresponding node to be routed to the first triplexer or the second triplexer.

8. The multiplexing architecture of claim 7 wherein at least one filter selection switch is further configured to route the respective signal to a bypass path for non-carrier aggregation operation.

9. The multiplexing architecture of claim 1 further comprising a plurality of first nodes configured to receive one or more respective low-band signals, a plurality of second nodes configured to receive one or more respective mid-band signals, and a plurality of third nodes configured to receive one or more respective high-band signals including either or both of the first high-band signal and the second high-band signal.

10. The multiplexing architecture of claim 9 wherein the multiplexing architecture is free of a filter selection switch between the respective nodes and the assembly of filters.

11. The multiplexing architecture of claim 10 wherein at least one set of nodes includes a bypass node for non-carrier aggregation operation.

12. The multiplexing architecture of claim 1 wherein the switch assembly includes a 3-pole-N-throw functionality, the N throws including a throw coupled to a common connection node of each of the first and second triplexers, the three poles including a first pole connected to a first antenna for transmit operations involving the low-band, the mid-band, the first high-band, and the second high-band.

13. The multiplexing architecture of claim 12 wherein the switch assembly is configured to route received signals from a second antenna, coupled to a second pole, to a multiple-input and multiple-output (MIMO) receiver block, coupled to another one of the N throws.

14. The multiplexing architecture of claim 13 wherein the switch assembly is configured to support an antenna swap functionality with a diversity antenna, through a third pole and another one of the N throws.

15. The multiplexing architecture of claim 1 further comprising a controller configured to control one or more switching operations associated with the multiplexing architecture.

16. A packaged module for wireless applications, comprising:
a packaging substrate configured to receive a plurality of components; and
a multiplexing circuit implemented on the packaging substrate, and including an assembly of filters including a first multiplexer that includes a low-band filter configured to support a low-band, a mid-band filter configured to support a mid-band, and a first high-band filter configured to support a first high-band, the assembly of filters further including a second multiplexer that includes a low-band filter configured to support the low-band, a mid-band filter configured to support the mid-band, and a second high-band filter configured to support a second high-band, each of the first and second high-band filters configured to support a respective frequency range that is smaller than a frequency range associated with a high-band filter of a single multiplexer that supports both of the first high-band and the second high-band, the multiplexing circuit further including a switch assembly implemented between the assembly of filters and one or more antenna nodes.

17. The packaged module of claim 16 wherein the first high-band includes a frequency range of 2496-2690 MHz, and the second high-band includes a frequency range of 2300-2400 MHz.

18. The packaged module of claim 17 wherein the low-band includes a frequency range of 700-960 MHz, and the mid-band includes a frequency range of 1452-2200 MHz.

19. The packaged module of claim 17 wherein the first high-band includes cellular bands B41 and B7, and the second high-band includes cellular bands B40 and B30.

20. A wireless device comprising:
a transceiver;
a plurality of antennas each configured to support either or both of transmit and receive operations; and
a multiplexing architecture implemented between the transceiver and the plurality of antennas, and including an assembly of filters including a first multiplexer that includes a low-band filter configured to support a low-band, a mid-band filter configured to support a mid-band, and a first high-band filter configured to support a first high-band, the assembly of filters further including a second multiplexer that includes a low-band filter configured to support the low-band, a mid-band filter configured to support the mid-band, and a second high-band filter configured to support a second high-band, each of the first and second high-band filters configured to support a respective frequency range that is smaller than a frequency range associated with a high-band filter of a single multiplexer that supports both of the first high-band and the second high-band, the multiplexing circuit further including a switch assembly implemented between the assembly of filters and one or more of the plurality of antennas.

* * * * *